(12) United States Patent
Tamura

(10) Patent No.: US 9,756,211 B2
(45) Date of Patent: Sep. 5, 2017

(54) APPARATUS EQUIPPED WITH FAX FUNCTION, CONTROL METHOD THEREOF, AND STORAGE MEDIUM

(71) Applicant: CANON KABUSHIKI KAISHA, Tokyo (JP)

(72) Inventor: Makiya Tamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/098,019

(22) Filed: Apr. 13, 2016

(65) Prior Publication Data

US 2016/0316093 A1    Oct. 27, 2016

(30) Foreign Application Priority Data

Apr. 22, 2015  (JP) ................. 2015-087610

(51) Int. Cl.
| | | |
|---|---|---|
| *G06F 3/12* | (2006.01) | |
| *H04N 1/32* | (2006.01) | |
| *H04N 1/00* | (2006.01) | |

(52) U.S. Cl.
CPC ..... *H04N 1/32016* (2013.01); *H04N 1/00206* (2013.01); *H04N 1/00344* (2013.01); *H04N 1/00411* (2013.01); *H04N 2201/0094* (2013.01); *H04N 2201/3278* (2013.01)

(58) Field of Classification Search
CPC ........... H04N 1/32016; H04N 1/00411; H04N 1/00344; H04N 1/00206

USPC ....................................................... 358/1.15
See application file for complete search history.

(56) References Cited

U.S. PATENT DOCUMENTS 7,184,160 B2 *  2/2007  El-Gazzar .......... H04N 1/32005
                                                358/1.15
7,715,059 B2 *  5/2010  Advocate ........... H04N 1/00832
                                                358/1.15

FOREIGN PATENT DOCUMENTS

| JP | 2000-069133 | 3/2000 |
|---|---|---|
| JP | 2009-290730 | 12/2009 |
| JP | 2011-071575 | 4/2011 |

OTHER PUBLICATIONS

U.S. Appl. No. 15/098,023, filed Apr. 13, 2016.
U.S. Appl. No. 15/098,029, filed Apr. 13, 2016.

* cited by examiner

*Primary Examiner* — Marivelisse Santiago Cordero
*Assistant Examiner* — Neil R McLean
(74) *Attorney, Agent, or Firm* — Fitzpatrick, Cella, Harper & Scinto

(57) ABSTRACT

An apparatus equipped with a fax function performs first and second settings on a user interface, wherein the first setting sets one or more specific fax numbers so that a printout of received fax data relating to the set one or more specific fax numbers is not produced, and wherein the second setting is a setting for a printout of received fax data, that relate to a fax number that does not exist in an address book, not to be produced.

8 Claims, 27 Drawing Sheets

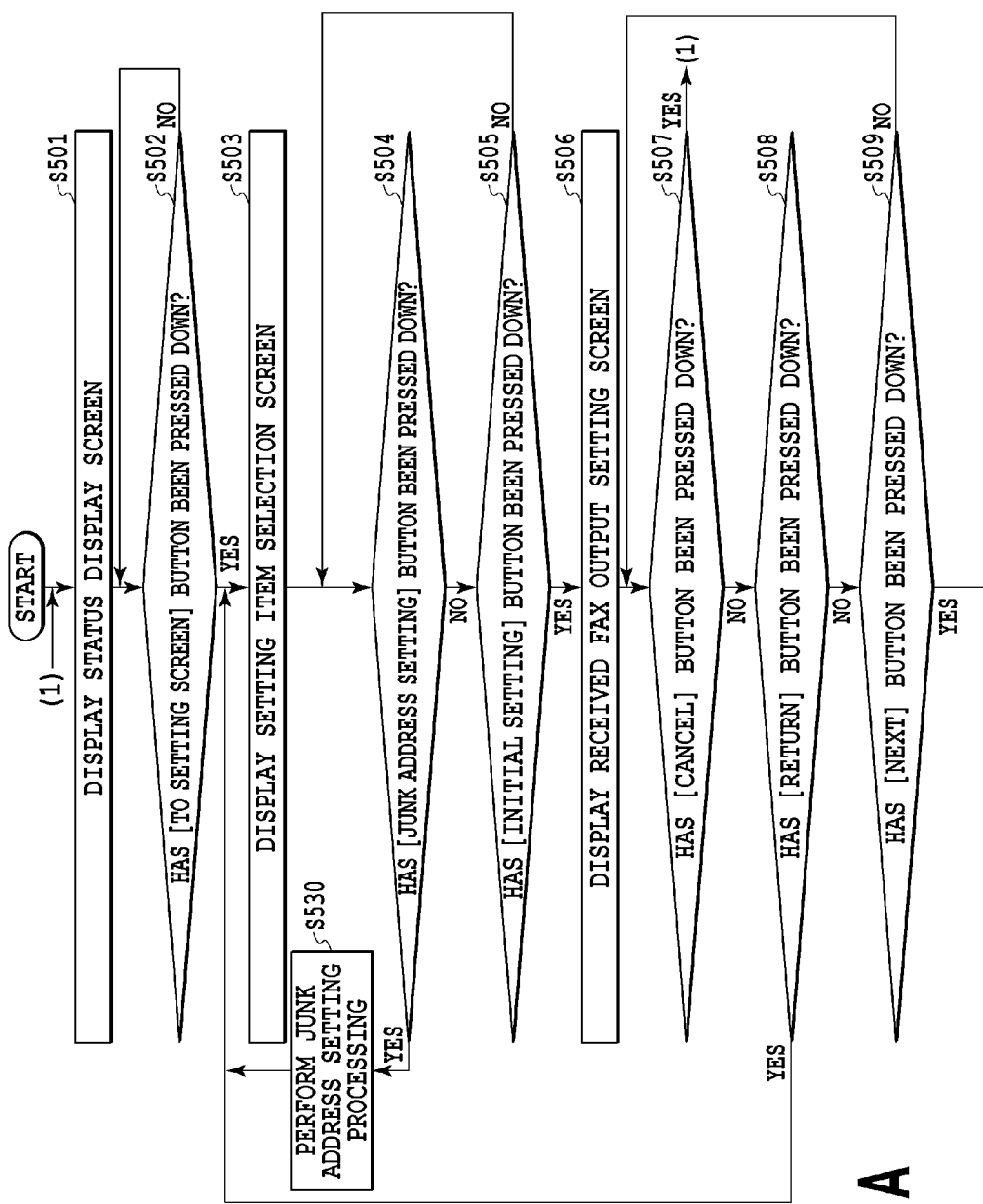

```
hostname,sharedserver ~1601
folderpath,root/ ~1602
username,administrator ~1603
password,32942xc45 ~1604
filenamerule,[REGISTNAME]_[FAXNUMBER]_[DATE&TIME] ~1605
folderrule,[REGISTNAME]/[FAXNUMBER]/[DATE] ~1606
print,off ~1607
Addressbookprint,off ~1608
```

FIG.16

| ADDRESS ID (1701) | NAME (1702) | FAX NUMBER (1703) |
|---|---|---|
| 0001 | ABC CORPORATION | 0311112222 |
| 0002 | X & CO., LTD. | 0333334444 |
| 0003 | Y REALTY & DEVELOPMENT CO., LTD. | 0355556666 |
| 0004 | Z BRANCH OFFICE | 0377778888 |
| ... | ... | ... |

FIG.17

| FAX NUMBER |
|---|
| 0312345678 |
| 0312349876 |
|  |
|  |
|  |

PRINTING-UNNECESSARY
NUMBER LIST

FIG.22

```
hostname,sharedserver ~~1601
folderpath,root/ ~~1602
username,administrator ~~1603
password,32942xc45 ~~1604
filenamerule,[REGISTNAME]_[FAXNUMBER]_[DATE&TIME] ~~1605
folderrule,[REGISTNAME]/[FAXNUMBER]/[DATE] ~~1606
print,off ~~ 1607
AnonymousnumberPrint,on ~~2401
```

FIG.24

APPARATUS EQUIPPED WITH FAX FUNCTION, CONTROL METHOD THEREOF, AND STORAGE MEDIUM

BACKGROUND OF THE INVENTION

Field of the Invention

The present invention relates to a printing control technique of received facsimile (hereinafter, referred to as fax) data.

Description of the Related Art

Japanese Patent Laid-Open No. 2011-071575 has disclosed the fax machine that does not accumulate fax data received from a communication partner other than specific communication partners registered in advance in the memory within the machine but produces a printout of the received fax data, and at the same time, accumulates fax data received from the specific communication partner in the memory so that the contents of the received fax data can be checked. With this configuration, it is possible to suppress a wasteful use of printing sheets and memories, and further, it is also possible to produce a printout of the fax data from the specific communication partner in accordance with the necessity.

By the method of Japanese Patent Laid-Open No. 2011-071575, wasteful printing on a printing sheet is suppressed by saving fax data received from the specific communication partner (specific fax number) registered in advance in the memory within the machine and by not producing a printout. However, in the case of this method, a user is obliged to register fax numbers one by one for which a printout is not necessary, and therefore, there is such a problem that registration requires more time and effort as the number of sources of transmission of faxes, such as junk faxes, for which a printout is not necessary increases.

SUMMARY OF THE INVENTION

An apparatus equipped with a fax function according to the present invention includes: a user interface that performs a first setting that can set received fax data relating to one or more specific fax numbers so that a printout of the received fax data is not produced, and a second setting that can set received fax data relating to a fax number that does not exist in an address book so that a printout of the received fax data is not produced; and a control unit configured to control production of a printout of received fax data in accordance with the first and second settings, and the control unit: performs control so that, in a case where the second setting is set, a printout of the received fax data is not produced on a condition that the fax number of the source of transmission of the received fax data corresponds to at least one of a fax number that does not exist in the address book and the specific fax number that is set by the first setting, and performs control so that a printout of the received fax data is produced on a condition that the fax number of the source of transmission of the received fax data corresponds to neither the fax number that does not exist in the address book nor the specific fax number that is set by the first setting; and performs control so that, in a case where the second setting is not set, a printout of the received fax data is not produced on a condition that the fax number of the source of transmission of the received fax data corresponds to the specific fax number that is set by the first setting, and performs control so that a printout of the received fax data is produced on a condition that the fax number of the source of transmission of the received fax data does not correspond to the specific fax number.

Further features of the present invention will become apparent from the following description of exemplary embodiments (with reference to the attached drawings).

BRIEF DESCRIPTION OF THE DRAWINGS

FIG. 5 is a diagram showing a relationship between FIGS. 5A to 5C;

FIGS. 5A to 5C are flowcharts showing a flow of setting processing to print and transfer received fax data to a file server;

FIG. 16 is a diagram showing an example of contents that are set as a transfer/printing setting;

FIG. 17 is a diagram showing an example of registered contents of an address book;

FIG. 22 is a diagram showing an example of a printing-unnecessary number list;

FIG. 24 is a diagram showing an example of contents that are set as a transfer/printing setting according to a modification example.

DESCRIPTION OF THE EMBODIMENTS

First Embodiment

Figure 1:
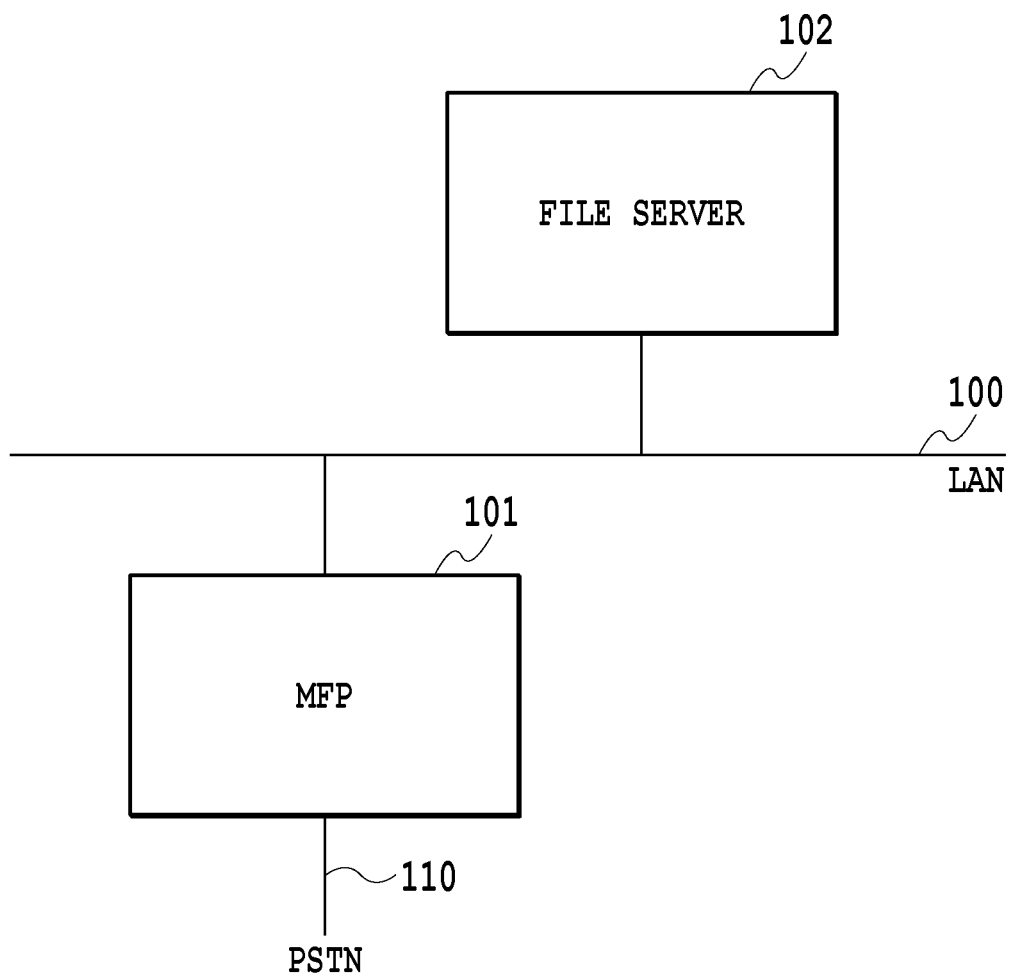
FIG. 1 is a diagram showing a configuration example of a fax data management system.

First, a first embodiment of the present invention is explained. FIG. 1 is a diagram showing a configuration example of a fax data management system according to the present embodiment. In the fax data management system shown in FIG. 1, an MFP 101 equipped with a plurality of functions, such as the fax function and the copy function, and a file server 102 are connected to each other via a LAN 100 so as to be capable of communication. In the present embodiment, both the MFP 101 and the file server 102 constitute the fax data management system, but a configuration in which the MFP 101 also has the function of the file server 102 may be accepted.

The MFP 101 is connected to PSTN (Public Switched Telephone Networks) 110 and is capable of performing fax communication of image data with a fax machine, not shown.

Figure 2:
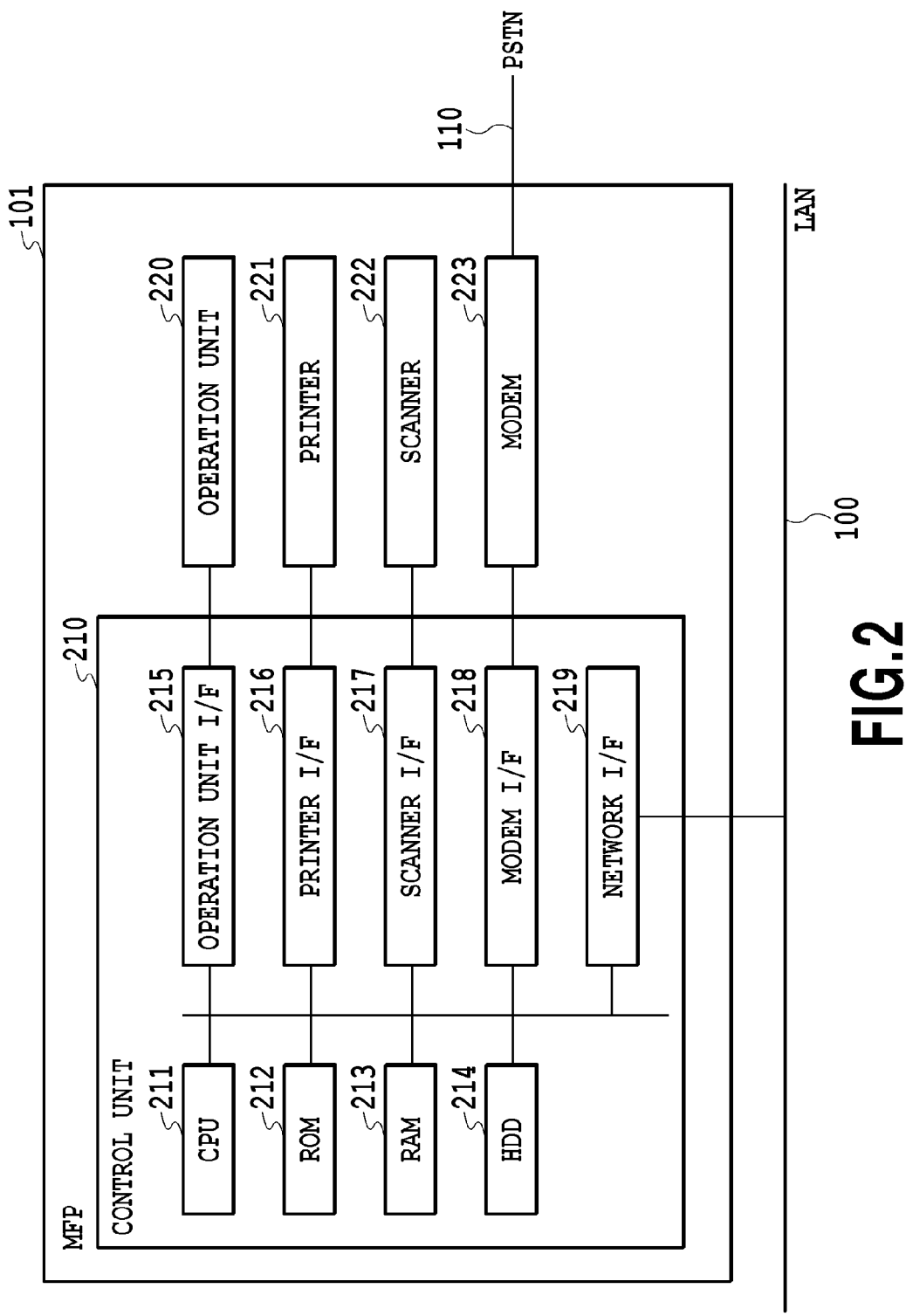
FIG. 2 is a diagram showing an example of a hardware configuration of an MFP.

FIG. 2 is a diagram showing an example of the hardware configuration of the MFP 101. A control unit 210 including a CPU 211 controls the entire operation of the MFP 101. The CPU 211 reads control programs that are stored in a ROM 212 and performs various kinds of control, such as read, printing, and communication. A RAM 213 is used as a main memory of the CPU 211 and a temporary storage area, such as a work area. In the MFP 101, it is assumed that the one CPU 211 performs each piece of processing shown in a flowchart, to be described later, by using one memory (the RAM 213 or an HDD 214), but it may also be possible to perform each piece of processing by causing a plurality of CPUs or a plurality of RAMS or HDDs to cooperate with one another.

The HDD 214 stores image data and various programs. An operation unit I/F 215 is an interface that connects an operation unit 220 and the control unit 210. The operation unit 220 includes a liquid crystal display unit having a touch panel function, a button board, etc., and plays a role as a reception unit configured to receive an operation, an input, and instructions from a user.

A printer I/F 216 is an interface that connects a printer 221 and the control unit 210. Image data that is printed by the printer 221 is transferred from the control unit 210 via the printer I/F 216 and is printed on a printing medium by the printer 221.

A scanner I/F 217 is an interface that connects a scanner 222 and the control unit 210. The scanner 222 reads the image of a document that is set on a document table or the like, not shown, and generates image data and inputs the image data to the control unit 210 via the scanner I/F 217. It is possible for the MFP 101 to transmit the image data generated by the scanner 222 by file transmission or as attached data of a mail.

A modem I/F 218 is an interface that connects a modem 223 and the control unit 210. The modem 223 performs fax communication of image data with a fax machine, not shown. A network I/F 219 is an interface that connects the control unit 210 (MFP 101) to the LAN 100. It is possible for the MFP 101 to transmit image data and information to an external device (the file server 102 or the like) on the LAN 100 and to receive various kinds of information by using the network I/F 219.

Figure 3:
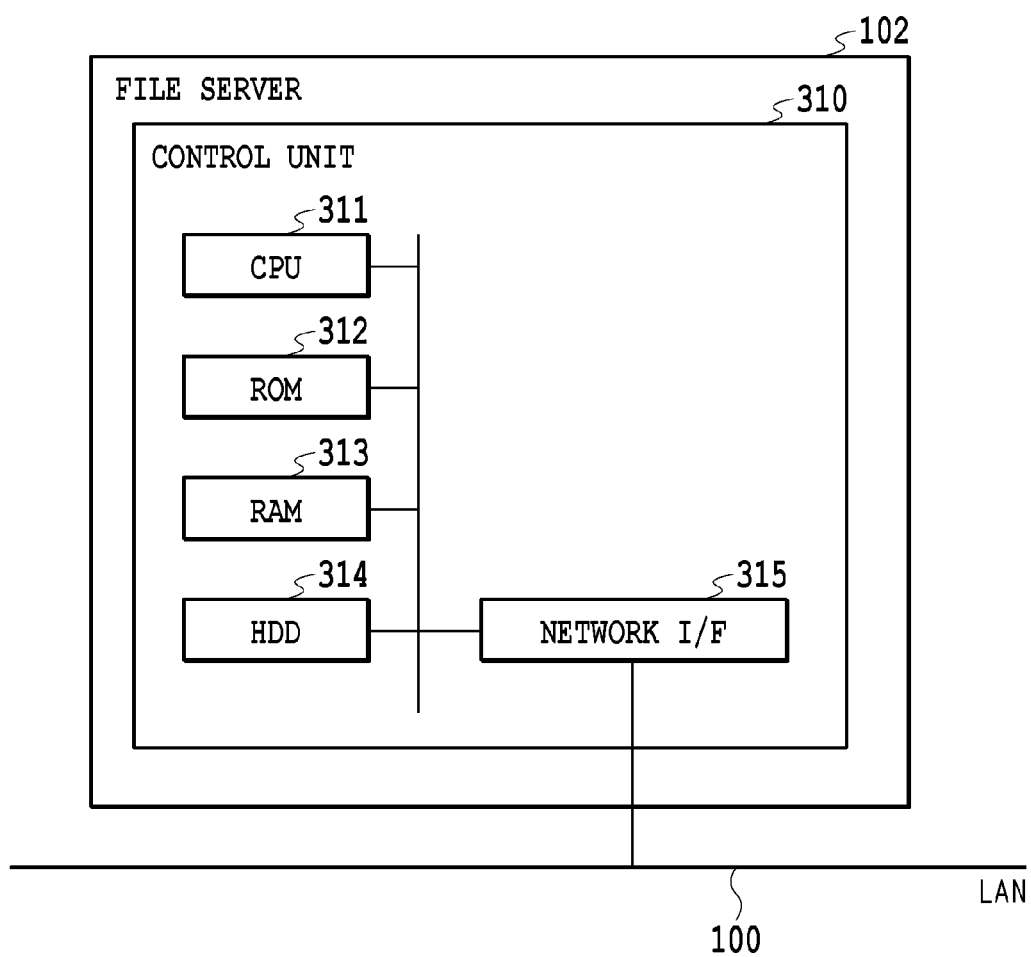
FIG. 3 is a diagram showing an example of a hardware configuration of a file server.

FIG. 3 is a diagram showing an example of the hardware configuration of the file server 102. A control unit 310 including a CPU 311 controls the entire operation of the file server 102. The CPU 311 reads control programs that are stored in a ROM 312 and performs various kinds of control processing. A RAM 313 is used as a main memory of the CPU 311 and a temporary storage area, such as a work area. An HDD 314 stores image data and various programs.

A network I/F 315 is an interface that connects the control unit 310 (the file server 102) to the LAN 100. The file server 102 performs transmission and reception of various kinds of information with another device on the LAN 100 by using the network I/F 315.

Figure 4:
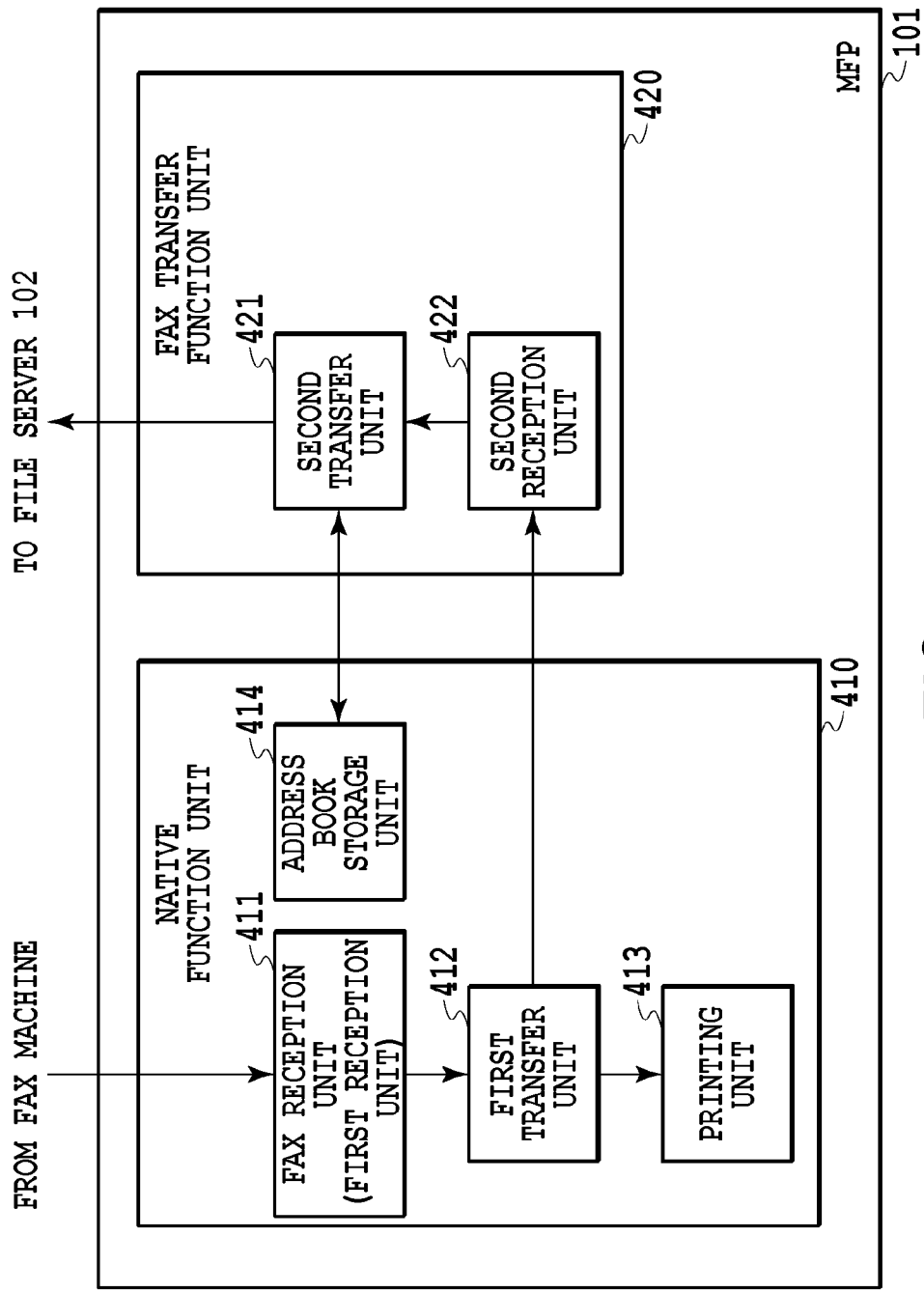
FIG. 4 is a diagram showing an example of a software configuration of functions relating to printing and storing of received fax data in a file server in the MFP.

FIG. 4 is a diagram showing an example of the software configuration of the functions relating to printing of received fax data and storing of received fax data in the file server 102 among the functions of the MFP 101. Printing and storing of received fax data in the file server 102 are implemented by two function units, i.e., a native function unit 410 and a fax transfer function unit 420, which is an additional function unit. In the case of the present embodiment, while each unit included in the native function unit 410 is provided to the MFP 101 as the standard, each unit included in the fax transfer function unit 420 is provided to the MFP 101 by an application for each unit being additionally installed. The fax transfer function unit 420 is implemented by an application based on Java (registered trademark) and addition of a function to the MFP 101 can be easily implemented. Another application, not shown, may be further installed on the MFP 101.

A fax reception unit (first reception unit) 411 receives image data that is transmitted via the PSTN 110 by fax. The fax reception unit 411 delivers the image data (fax data) received by fax to a first transfer unit 412 after converting the image data into data in the PDF format. At this time, the fax reception unit 411 creates a control file including information on the source of transmission of the fax data (fax number of the source of transmission) and the date and time of reception of the fax data and delivers the control file to the first transfer unit 412 along with the fax data.

The first transfer unit 412 transfers the fax data received from the fax reception unit 411 in accordance with a condition that is set in advance. As the transfer destination of the fax data, it is possible to set a printing unit 413, the file server 102, a PC (not shown) on the LAN 100, etc., but here, it is assumed that a setting is performed so that all the fax data received by the fax reception unit 411 is once transferred to the fax transfer function unit 420. The first transfer unit 412 has an FTP (File Transfer Protocol) client function and also transfers the fax data by FTP to a second reception unit 422 having an FTP server function. The control file created by the fax reception unit 411 is also transferred by FTP to the second reception unit 422 along with the fax data.

The printing unit 413 forms an image on a sheet in accordance with the fax data or the like received from the first transfer unit 412 and outputs the sheet.

An address book storage unit 414 stores address information in which the name of each source of transmission, which is specified by a user of the MFP 101, and the fax number, which is identification information thereon, are associated with each other as address book data. Details of the address book data that is stored in the address book storage unit 414 will be described later.

The second reception unit 422 receives fax data internally transferred from the first transfer unit 412 and delivers the fax data to a second transfer unit 421. The second transfer unit 421 transfers (transmits) the fax data to the file server 102 in accordance with a transfer setting, to be described later. For the transfer here, it is possible to use SMB (Server Message Block), WebDAV (Distributed Authoring and Versioning protocol for the WWW), etc., besides FTP. Further, the second transfer unit 421 is permitted to access the address book storage unit 414 and acquires a registered name, to be described later.

Figure 5B:
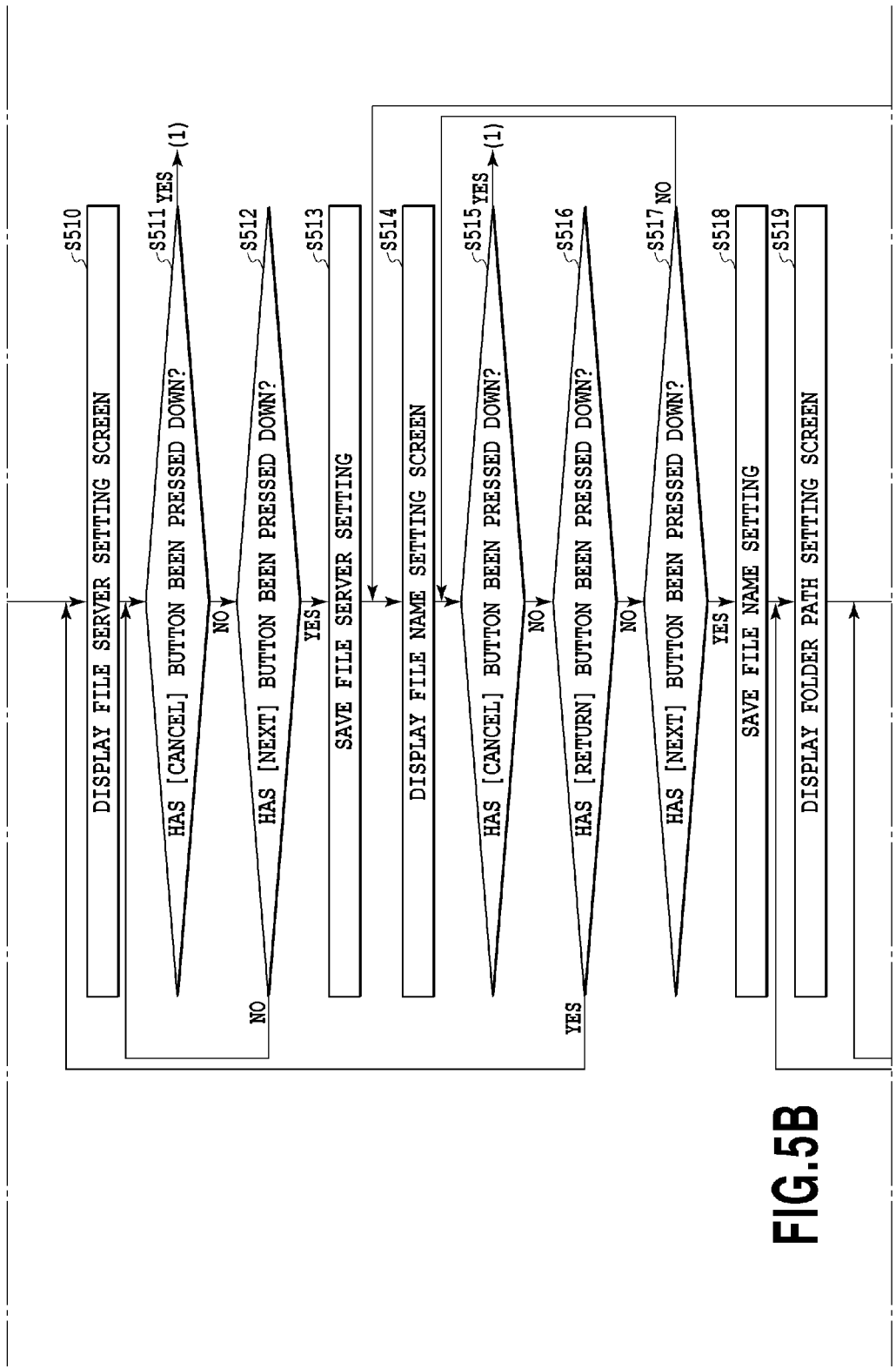
Figure 5C:
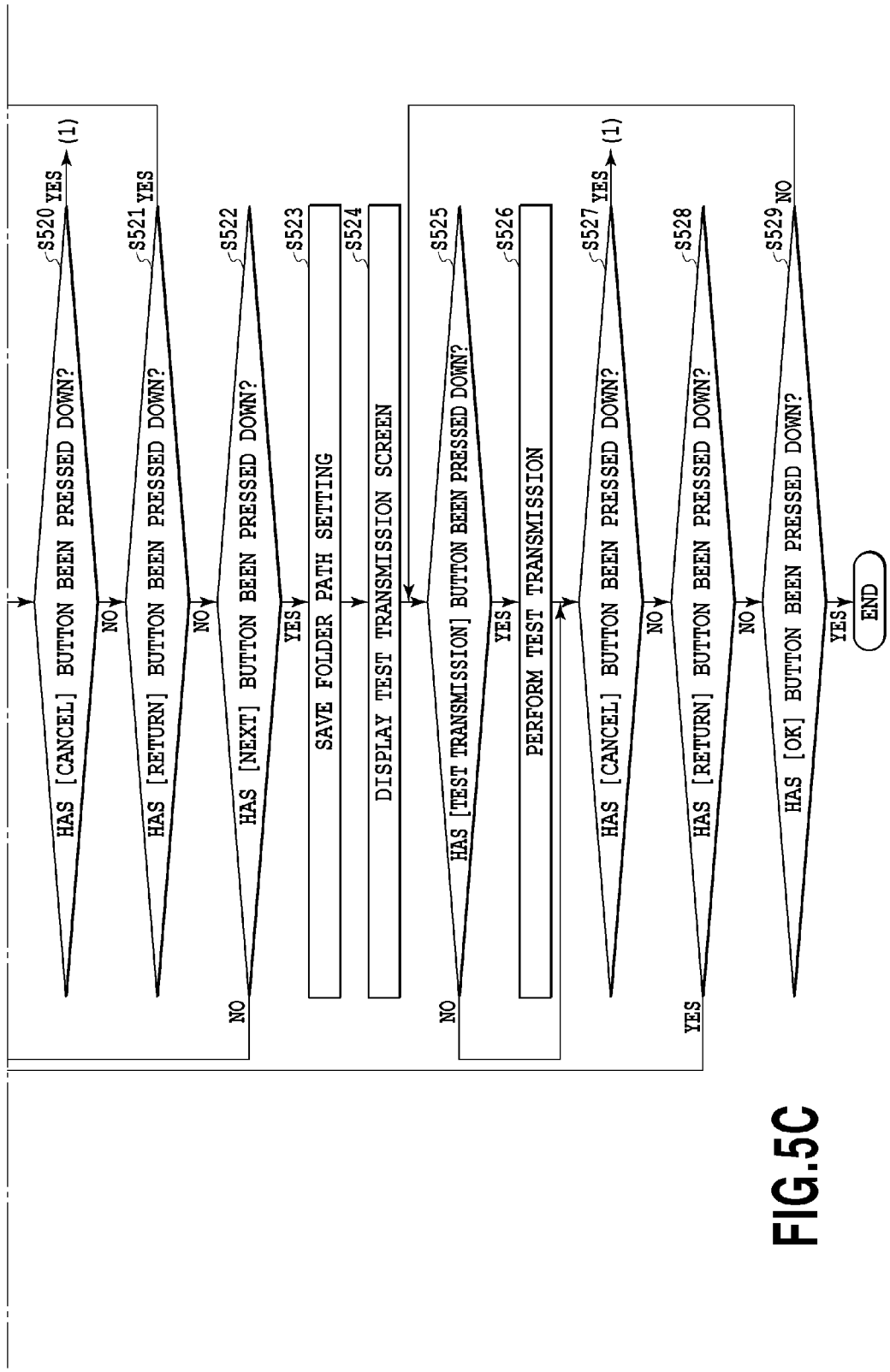

FIGS. 5A to 5C are flowcharts showing a flow of setting processing to print and transfer fax data received by the MFP 101 to the file server 102. The series of processing is implemented by the CPU 211 executing the control program stored in the HDD 214 after developing the control program onto the RAM 213.

Figure 6:
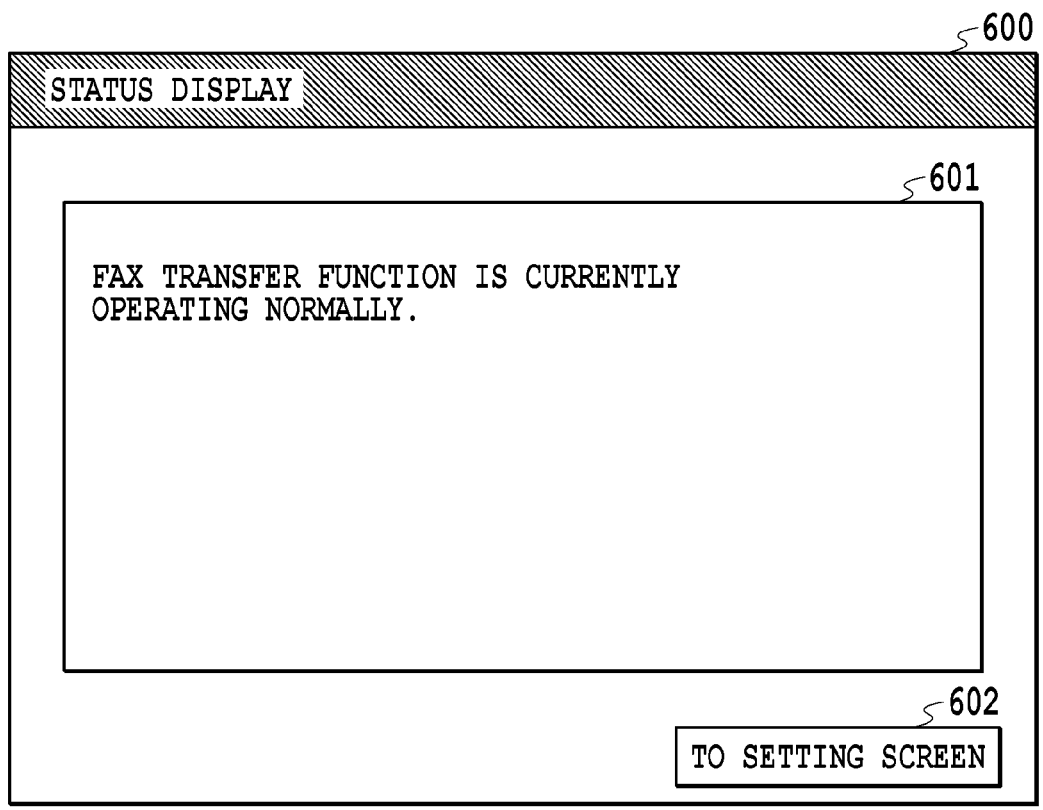
FIG. 6 is a diagram showing an example of a Status display screen.

First, at step 501, a status display screen is displayed on the operation unit 220. FIG. 6 is a diagram showing an example of a status display screen. In a status display area 601 on a Status display screen 600, a message indicating the current operation status of the fax transfer function unit 420 is displayed. The example in FIG. 6 shows that the fax transfer function unit 420 is currently operating normally. In the case where, for example, the transfer of fax data to the file server 102 has failed, or in the case of the state where the fax transfer function unit 420 does not operate normally, a message indicating the fact is displayed in the status display area 601. It may also be possible to further provide an operation button for updating the display contents in the status display area 601 within the Status display screen 600.

At step 502, whether or not a [To setting screen] button 602 on the Status display screen 600 has been pressed down is determined. Here, the processing stands by until the [To setting screen] button 602 is pressed down and in the case where it is determined that the [To setting screen] button 602 has been pressed down, the processing proceeds to step 503. On the Status display screen 600 shown in FIG. 6, only the one button ([To setting screen] button 602) is provided, but it may also be possible to provide, for example, a button for making a direct transition into each setting screen (e.g., FIG. 7 to FIG. 10), to be described later.

Figure 7:
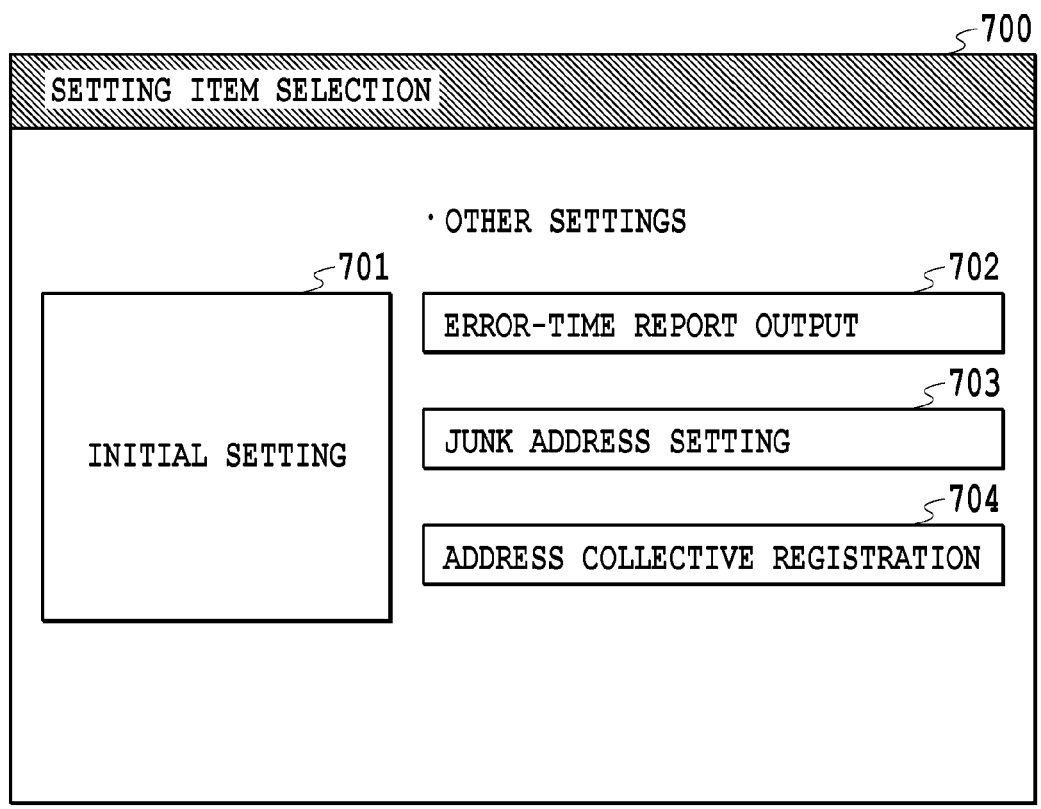
FIG. 7 is a diagram showing an example of a Setting item selection screen.

At step 503, a setting item selection screen is displayed on the operation unit 220. FIG. 7 is a diagram showing an example of a setting item selection screen. An [Initial setting] button 701 within a Setting item selection screen 700 is a button for performing an output setting and transfer/printing setting processing of a received fax. An [Error-time report output] button 702 is a button for performing a report output setting at the time of error. A [Junk address setting] button 703 is a button for performing a management setting of a fax number relating to fax data for which a printout is not produced (e.g., junk fax data) among received fax data. An [Address collective registration] button 704 is a button for collectively performing an address registration setting for the address book. The processing in the case where the [Error-time report output] button 702 is pressed down and the processing in the case where the [Address collective registration] button 704 is pressed down slightly relate to the present invention, and therefore, explanation thereof is omitted.

At step 504, whether or not the [Junk address setting] button 703 has been pressed down is determined. In the case where the [Junk address setting] button 703 has not been pressed down, the processing proceeds to step 505 and in the case where the [Junk address setting] button 703 has been pressed down, the processing proceeds to step 530. The contents of various kinds of setting processing (setting operations) relating to the junk address at step 530 will be explained in a later section.

At step 505, whether or not the [Initial setting] button 701 has been pressed down is determined. In the case where the [Initial setting] button 701 has been pressed down, the processing proceeds to step 506 and in the case where the [Initial setting] button 701 has not been pressed down, the processing returns to step 504. In the present embodiment, the processing is designed so as to standby until the [Junk address setting] button 703 or the [Initial setting] button 701 is pressed down. For example, it may also be possible to further provide a button for returning to the Status display screen 600 on the above-described Setting item selection screen 700, and further to provide a step at which whether or not the button has been pressed down.

Figure 8:
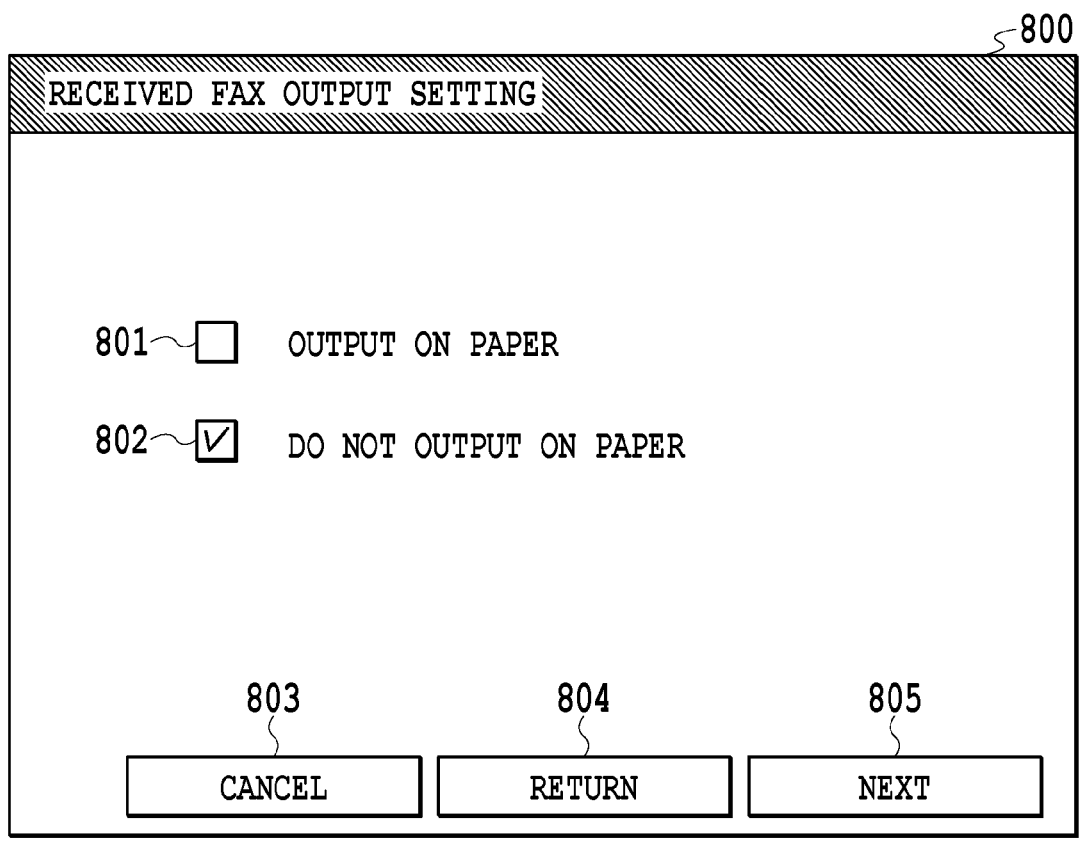
FIG. 8 is a diagram showing an example of a Received fax output setting screen.

At step 506, a received fax output setting screen is displayed on the operation unit 220. FIG. 8 is a diagram showing an example of a received fax output setting screen. On a Received fax output setting screen 800, printout control is specified for all the received faxes by using a checkbox 801 or 802. The checkbox 801 and the checkbox 802 are in an exclusive relationship. In the case where the checkbox 801 is checked, a setting is set so that received fax data is output on paper. However, in the case where the checkbox 801 is checked and on a condition that the fax number of the received fax data is registered in a printing-unnecessary number list, to be described later, the data is not output on paper. In the case where the checkbox 802 is checked, a setting is set so that the received fax data is not output on paper. In the example in FIG. 8, the checkbox 802 is checked, and therefore, the setting is set so that the received fax data is not output on paper.

At step 507, whether or not a [Cancel] button 803 within the Received fax output setting screen 800 has been pressed down is determined. In the case where the [Cancel] button 803 has been pressed down, the processing returns to step 501 and the Status display screen 600 is displayed. In the case where the [Cancel] button 803 has not been pressed down, the processing proceeds to step 508.

At step 508, whether or not a [Return] button 804 within the Received fax output setting screen 800 has been pressed down is determined. In the case where the [Return] button 804 has been pressed down, the processing returns to step 503 and the Setting item selection screen 700 is displayed. In the case where the [Return] button 804 has not been pressed down, the processing proceeds to step 509.

At step 509, whether or not a [Next] button 805 within the Received fax output setting screen 800 has been pressed down is determined. In the case where the [Next] button 805 has been pressed down, the processing proceeds to step 510. In the case where the [Next] button 805 has not been pressed down, the processing returns to step 507.

Figure 9:
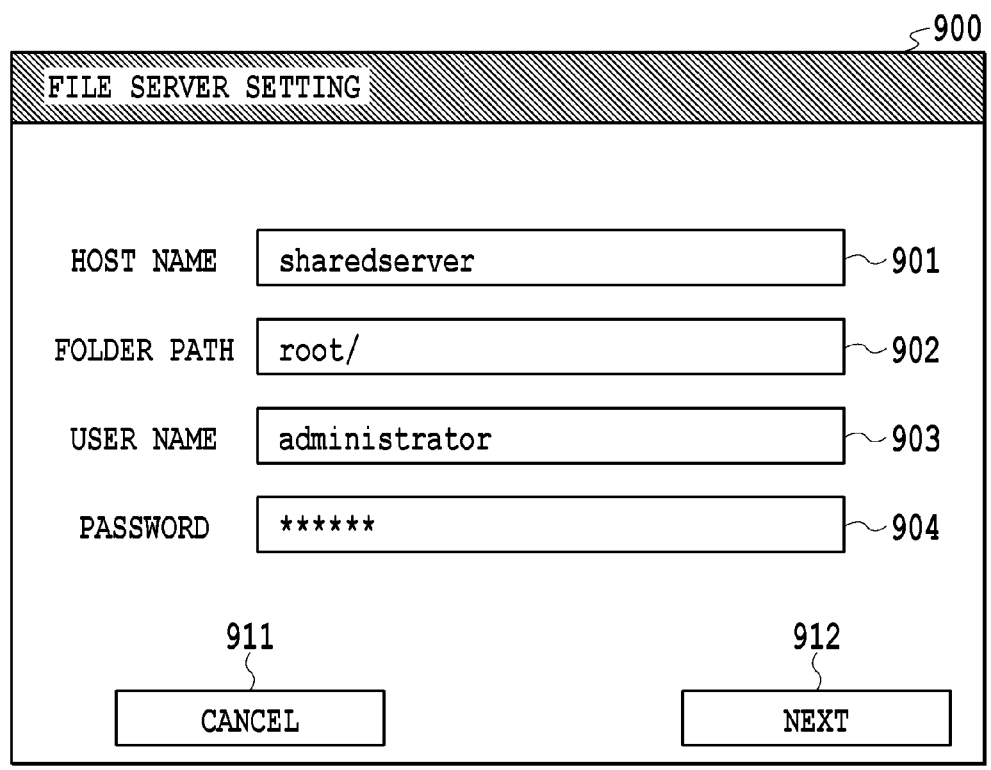
FIG. 9 is a diagram showing an example of a File server setting screen.

At step 510, a file server setting screen is displayed on the operation unit 220. FIG. 9 is a diagram showing an example of a file server setting screen. A user of the MFP 101 inputs information for specifying the file server 102 and information for accessing the file server 102 via a File server setting screen 900 shown in FIG. 9. Specifically, in a Host name input box 901, the host name of the file server 102 is input. In a Folder path input box 902, the starting point of a folder path for specifying the storage destination of received fax data is input. In a User name input box 903 and in a Password input box 904, authentication information (user name and password) necessary to log in to the file server 102 is input.

At step 511, whether or not a [Cancel] button 911 within the File server setting screen 900 has been pressed down is determined. In the case where the [Cancel] button 911 has been pressed down, the processing returns to step 501 and the Status display screen 600 is displayed. In the case where the [Cancel] button 911 has not been pressed down, the processing proceeds to step 512 and whether or not a [Next] button 912 has been pressed down is determined. Then, in the case where the [Next] button 912 has been pressed down, the processing proceeds to step 513. In the case where the [Next] button 912 has not been pressed down, the processing returns to step 511.

At step 513, the contents of the file server settings that are input to the input boxes 901 to 904 within the File server setting screen 900 are saved in the HDD 214.

Figure 10:
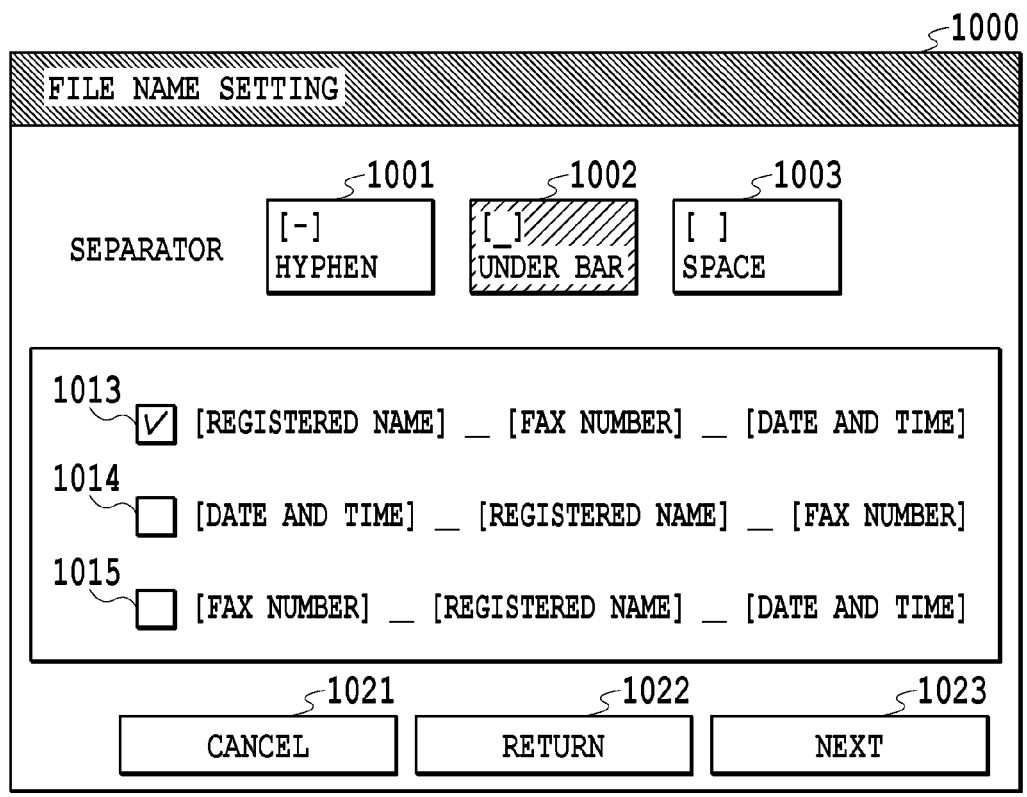
FIG. 10 is a diagram showing an example of a File name setting screen.

At step 514, a file name setting screen is displayed on the operation unit 220. FIG. 10 is a diagram showing an example of a file name setting screen. A user of the MFP 101 specifies a setting rule of a file name that is set to fax data to be transferred to the file server 102 via a File name setting screen 1000 shown in FIG. 10. It is possible to set a file name, which is a combination of three kinds of information, i.e., [registered name], [fax number], and [date and time], to the fax data to be transferred to the file server 102 by the fax transfer function unit 420. [registered name] is the name registered in advance in the address book in association with the fax number of the source of transmission of the fax data. [fax number] is the fax number of the source of transmission of the fax data. [date and time] is the date and time of reception of the fax data. It is possible for a user of the MFP 101 to select a separator (delimiter) for separating the above-described three kinds of information by using operation buttons 1001 to 1003. In the case where the operation button 1001 is pressed down, [-] (hyphen) is selected. In the case where the operation button 1002 is pressed down, [_] (under bar) is selected. In the case where the operation button 1003 is pressed down, [ ] (space) is selected. It is known that [_] (under bar) is selected in the example shown schematically. Further, it is also possible for a user of the MFP 101 to specify the order of the above-described three kinds of information by using checkboxes 1013 to 1015. Here, in the case of the checkbox 1013, a file name, which is a combination of the above-described three kinds of information in the order of [registered name], [fax number], and [date and time], is set as a result. For example, in the case where the registered name is "ABC Corporation", the fax number is "03-1111-2222", and the date and time is "2013/01/01 12:15:10 (in the case where the format is "YYYY/MM/DD HH:MM:SS)", a file name of "ABC Corporation_0311112222_20130101121510.PDF" is set. Similarly, in the case of the checkbox 1014, a file name, which is a combination of the three kinds of information in the order of [date and time], [registered name], and [fax number], is set. Further, in the case of the checkbox 1015, a file name, which is a combination of the three kinds of information in the order of [fax number], [registered name], and [date and time], is set. Here, all the permutations are not taken to be candidates (only part of the permutations are taken to be candidates), but it may also be possible to display all the permutations as candidates.

At step 515, whether or not a [Cancel] button 1021 within the File name setting screen 1000 has been pressed down is determined. In the case where the [Cancel] button 1021 has been pressed down, the processing returns to step 501 and the Status display screen 600 is displayed. In the case where the [Cancel] button 1021 has not been pressed down, the processing proceeds to step 516 and whether or not a [Return] button 1022 has been pressed down is determined. Then, in the case where the [Return] button 1022 has been pressed down, the processing returns to step 510 and the File server setting screen 900 is displayed. In the case where the [Return] button 1022 has not been pressed down, the processing proceeds to step 517 and whether or not a [Next] button 1023 has been pressed down is determined. Then, in the case where the [Next] button 1023 has been pressed down, the processing proceeds to step 518. In the case where the [Next] button 1023 has not been pressed down, the processing returns to step 515.

At step 518, the contents specified via the Filename setting screen 1000 are saved in the HDD 214.

Figure 11:
FIG. 11 is a diagram showing an example of a Folder path setting screen.

At step 519 that follows, a Folder path setting screen 1100 is displayed on the operation unit 220. FIG. 11 is a diagram showing an example of the folder path setting screen. A user of the MFP 101 specifies a setting rule of a folder path for specifying a folder, which is the storage destination of fax data, via the Folder path setting screen 1100 shown in FIG. 11. Here, in the case where a checkbox 1101 is checked, fax data is stored in the folder specified by selection boxes 1111 to 1113 and in the case where the checkbox 1101 is not checked, fax data is stored in the area indicated by Folder path 902 on the File server setting screen 900. In the selection box 1111, the type of information that is used as a folder name of First hierarchy (the highest hierarchy of the three hierarchies) is specified. A user of the MFP 101 selects the type of information from among the candidates of [registered name], [fax number], and [date] presented in a pull-down menu. In the selection box 1112, the type of information that is used as a folder name of Second hierarchy (the middle hierarchy of the three hierarchies) is specified. A user of the MFP 101 selects the type of information from among the candidates of [registered name], [fax number], and [date] presented in a pull-down menu as in the case of First hierarchy. In the selection box 1113, the type of information that is used as a folder name of Third hierarchy (the lowest hierarchy of the three hierarchies) is specified. As in the case of First hierarchy, a user of the MFP 101 selects the type of information from among the candidates of [registered name], [fax number], and [date] presented in a pull-down menu. It is also possible to leave the selection boxes 1111 to 1113 in the state where no type is selected, and in this case, the fax data is stored, for example, within the folder specified in the selection box 1112. In a display box 1114, the order of various kinds of information in accordance with the selection for each hierarchy in the selection boxes 1111 to 1113 is displayed. In the example in FIG. 11, it is known that the folder name of First hierarchy is [registered name], the folder name of Second hierarchy is [fax number], and the folder name of Third hierarchy is [date]. By attaching the folder path shown in the display box 1114 to the end of the character string specified in Folder path 902 on the File server setting screen 900, a final folder path is completed. For example, in the case where the registered name is "ABC Corporation", the fax number is "03-1111-2222", and the date is "2013/01/01", a folder path of "root/ABC Corporation/0311112222/20130101" is set as a result.

At step 520, whether or not a [Cancel] button 1121 within the Folder path setting screen 1100 has been pressed down is determined. In the case where the [Cancel] button 1121 has been pressed down, the processing returns to step 501 and the Status display screen 600 is displayed. In the case where the [Cancel] button 1121 has not been pressed down, the processing proceeds to step 521 and whether or not a [Return] button 1122 has been pressed down is determined. Then, in the case where the [Return] button 1122 has been pressed down, the processing returns to step 514 and the File name setting screen 1000 is displayed. In the case where the [Return] button 1122 has not been pressed down, the processing proceeds to step 522 and whether or not a [Next] button 1123 has been pressed down is determined. Then, in the case where the [Next] button 1123 has been pressed down, the processing proceeds to step 523. In the case where the [Next] button 1123 has not been pressed down, the processing returns to step 520.

At step 523, the contents specified via the Folder path setting screen 1100 are saved in the HDD 214.

Figure 12:
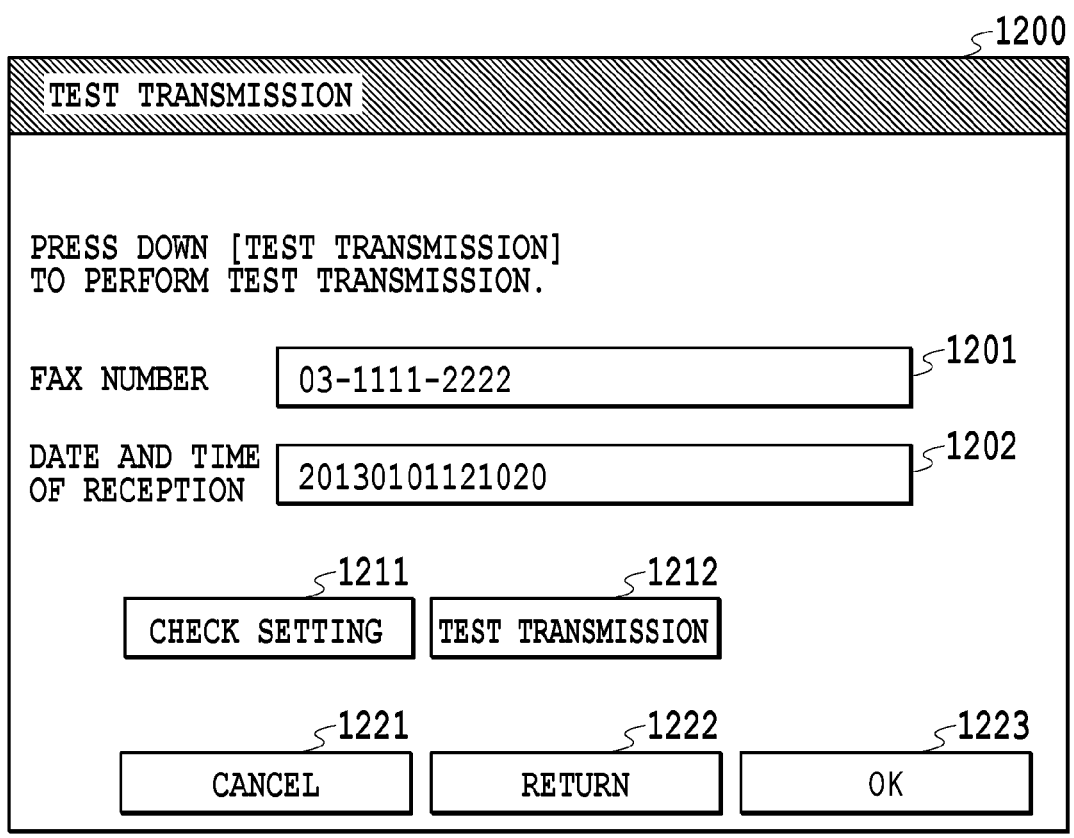
FIG. 12 is a diagram showing an example of a Test transmission screen.

At step 524 that follows, a test transmission screen is displayed on the operation unit 220. FIG. 12 is a diagram showing an example of a test transmission screen. It is possible for a user of the MFP 101 to perform test transmission to the file server 102 via a Test transmission screen 1200 shown in FIG. 12. In a Fax number input box 1201 within the Test transmission screen 1200, the fax number of an arbitrary source of transmission that is used for test transmission is input. Further, in a Date and time of reception input box 1202, an arbitrary date and time of reception that is used for test transmission is input. Although omitted in the present flowchart, by pressing down a [Setting check] button 1211, based on the settings performed in the Fax number input box 1201, in the Date and time of reception input box 1202, and on each screen in FIGS. 9 to 11 described previously, in which folder and with which name the fax data is stored is displayed. Due to this, it is possible for a user to check the contents of the settings.

At step 525, whether or not a [Test transmission] button 1212 within the Test transmission screen 1200 has been pressed down is determined. In the case where the [Test transmission] button 1212 has been pressed down, the processing proceeds to step 526 and in the case where the [Test transmission] button 1212 has not been pressed down, the processing proceeds to step 527.

At step 526, test transmission is performed based on the contents that are input in the Fax number input box 1201 and in the Date and time of reception input box 1202, and the contents of the settings performed on the screens in FIG. 9 to FIG. 11. In the test transmission, test image data that is held in advance within the fax transfer function unit 420 (within the HDD 214) is transmitted to the file server 102 actually. Due to the execution of the test transmission, it is possible for a user to check that fax data is stored normally in the folder of the file server 102. It may also be possible to display a screen to show the results of test transmission after performing the test transmission.

At step 527, whether or not a [Cancel] button 1221 within the Test transmission screen 1200 has been pressed down is determined. In the case where the [Cancel] button 1221 has been pressed down, the processing returns to step 501 and the Status display screen 600 is displayed. In the case where the [Cancel] button 1221 has not been pressed down, the processing proceeds to step 528 and whether or not a [Return] button 1222 has been pressed down is determined. Then, in the case where the [Return] button 1222 has been pressed down, the processing returns to step 519 and the Folder path setting screen 1100 is displayed. In the case where the [Return] button 1222 has not been pressed down, the processing proceeds to step 529 and whether or not an [OK] button 1223 has been pressed down is determined. Then, in the case where the [OK] button 1223 has not been pressed down, the processing returns to step 525. In the case where the [OK] button 1223 has been pressed down, the present processing is terminated.

The above is the contents of the setting processing to print and transfer received fax data to the file server 102.

<Junk Address Setting>

Subsequently, various kinds of setting processing (setting operations) relating to the junk address at step 530 described above are explained.

Figure 13:
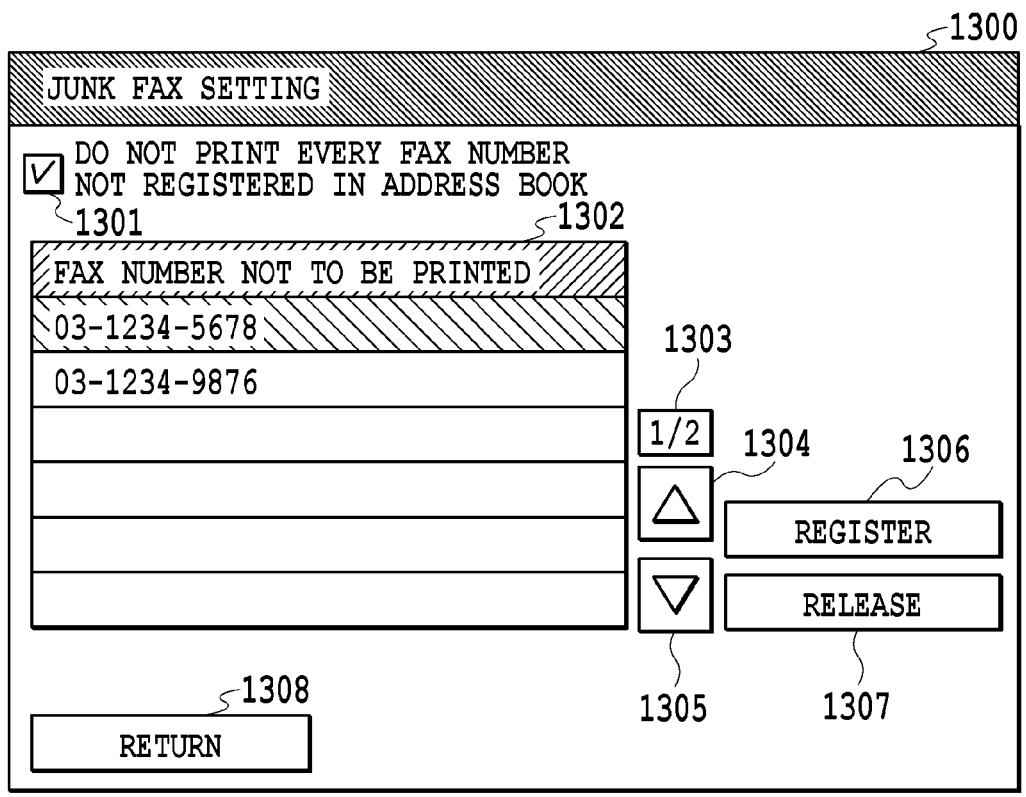
FIG. 13 is a diagram showing an example of a Junk fax setting screen.

First, at step 530, a junk fax setting screen is displayed on the operation unit 220. FIG. 13 is a diagram showing an example of a junk fax setting screen. A checkbox 1301 is a checkbox for setting whether to produce a printout of received fax data the source of transmission of which is a fax number not registered in the address book. In the state where the checkbox 1301 is checked, the printout of the received fax from the fax number not registered in the address book is not produced. In a display box 1302, data of a list (hereinafter, "printing-unnecessary number list", see FIG. 22) in which fax numbers relating to faxes for which printing is not necessary, such as a junk fax, among the received fax data is displayed. In the example in FIG. 13, two fax numbers ("03-1234-5678" and "03-1234-9876") registered in the printing-unnecessary number list shown in FIG. 22 are displayed in a list. In other words, in the present embodiment, in the case where the checkbox 1301 is checked, the printout of the received fax data from the fax number not registered in the address book is not produced, and further, the printout of the received fax data from the fax number registered in the printing-unnecessary number list is also not produced. In a display box 1303, the total number of fax numbers for which printing is not performed and which are registered in the printing-unnecessary number list in FIG. 22, and information on the position of the currently selected fax number from the top (i.e., information on how many fax numbers exist above the currently selected fax number) in the printing-unnecessary number list are shown. In the example in FIG. 13, "½" is displayed, indicating that the total number of fax numbers already registered in the list as the fax numbers for which printing is not necessary is two, and the currently selected fax number is the first fax number from the top. A [Δ] button 1304 and a [∇] button 1305 are buttons for changing the position of the fax number to be displayed in the list. These buttons are buttons that are displayed in the state where fax numbers in the number that cannot be displayed simultaneously are registered within the printing-unnecessary number list. In the example in FIG. 13, it is possible to display six fax numbers simultaneously, and therefore, in the case where seven or more fax numbers are registered in the printing-unnecessary number list, the [Δ] button 1304 and the [∇] button 1305 become effective. The [Δ] button 1304 is a button for changing the position of the fax number to be displayed in the upward direction in the list. The [∇] button 1305 is a button for changing the position of the fax number to be displayed in the downward direction in the list.

Figure 14:
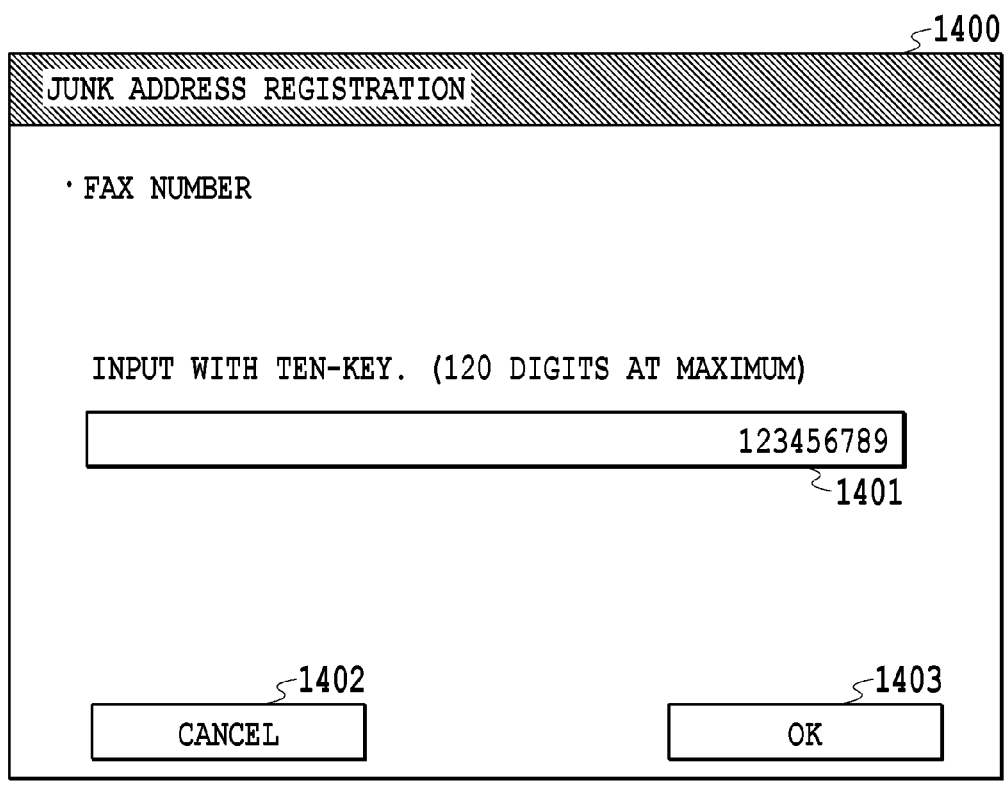
FIG. 14 is a diagram showing an example of a Junk address registration screen.

A [Registration] button 1306 is a button for displaying an operation screen (junk address registration screen) for additionally registering a fax number in the printing-unnecessary number list on the operation unit 220. FIG. 14 is a diagram showing an example of a junk address registration screen. An input box 1401 on a Junk address registration screen 1400 is a field into which a fax number to be registered in the printing-unnecessary number list is input. In the example in FIG. 14, a state where "123456789" is input is shown. A [Cancel] button 1402 is a button for cancelling processing to register a fax number as a junk address. In the case where the [Cancel] button 1402 is pressed down, the screen returns to a Junk fax setting screen 1300. An [OK] button 1403 is a button for performing processing to register a fax number in the printing-unnecessary number list. In the case where the [OK] button 1403 is pressed down, the fax number that is input into the input field 1401 is registered in the above-described printing-unnecessary number list.

Figure 15:
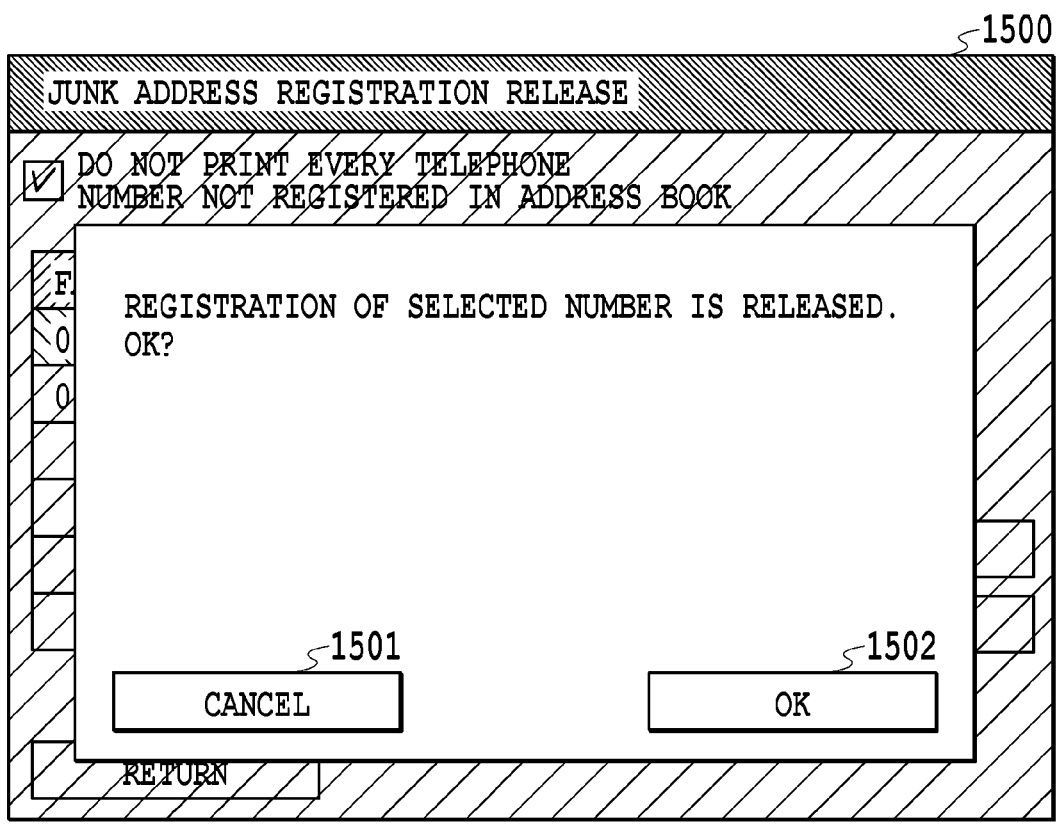
FIG. 15 is a diagram showing an example of a Junk address registration release screen.

A [Release] button 1307 is a button for releasing the registration of a fax number registered in the printing-unnecessary number list. In the case where a user selects a fax number the registration of which is to be released from the display box 1302 within the Junk fax setting screen 1300 and presses down the [Release] button 1307, an operation screen (junk address registration release screen) for checking the release of the registration of a junk address is displayed on the operation unit 220. FIG. 15 is a diagram showing an example of a junk address registration release screen. A [Cancel] button 1501 on a Junk address registration release screen 1500 is a button for cancelling the release processing. In the case where the [Cancel] button 1501 is pressed down, the screen returns to the Junk fax setting screen 1300. An [OK] button 1502 is a button for performing the release. In the case where the [OK] button is pressed down, the fax number selected on the Junk fax setting screen 1300 is deleted from the printing-unnecessary number list. After the deletion is completed, the Junk fax setting screen 1300 is displayed.

A [Return] button 1308 is a button for returning the screen to the Setting item selection screen 700. In the case where the [Return] button 1308 is pressed down, the processing proceeds to step 503 and the Setting item selection screen 700 is displayed again.

The above is the contents of the various kinds of setting processing relating to a junk address.

Next, the "transfer/printing setting" that is set in accordance with the setting processing (flowcharts in FIGS. 5A to 5C) to print and transfer received fax data described above is explained. FIG. 16 is a diagram showing an example of the contents that are set as the "transfer/printing setting". On a line 1601, the host name of the file server 102 that is input in the Host name input box 901 on the File server setting screen 900 is described. On a line 1602, the starting point of the folder path that is input in the Folder path input box 902 on the File server setting screen 900 is described. On a line 1603, the user name to log in to the file server 102 that is input in the User name input box 903 on the File server setting screen 900 is described. On a line 1604, the password to log in to the file server 102 that is input in the Password input box 904 on the File server setting screen 900 is described. On a line 1605, the setting rule of the file name that is set on the File name setting screen 1000 is described. In the example in FIG. 16, the file name is set by using the separator of [_] (under bar) in the order of [registered name], [fax number], and [date and time]. On a line 1606, the setting rule of the folder path that is set on the Folder path setting screen 1100 is described. On a line 1607, the setting to output on paper that is set on the Received fax output setting screen 800 is described. In the example in FIG. 16, a Print setting is "OFF", i.e., the setting is that received fax data is not output on paper. In the case of the setting that received fax data is output on paper, the Print setting is "ON". On a line 1608, whether or not the checkbox 1301 on the Junk fax setting screen 1300 is checked, i.e., the setting whether or not to output on paper the received fax from the fax number not registered in the address book is described. In the example in FIG. 16, An AddressbookPrint setting is "OFF", i.e., the setting is that received fax from the fax number not registered in the address book is output on paper (the checkbox is not checked). In the case of the setting that received fax from the fax number not registered in the address book is not output on paper (the checkbox is checked), the AddressbookPrint setting is "ON". These pieces of information are stored in the HDD 214 as the "transfer/printing setting" in the format, such as CSV and XML.

Next, the address book that is stored in the address book storage unit 414 of the native function unit 410 is explained. FIG. 17 is a diagram showing an example of the registered contents of the address book. Address ID 1701 is the ID capable of uniquely identifying each address that is registered in the address book. Name 1702 is the name of each address that is registered in the address book. Fax number 1703 is the fax number of each address that is registered in the address book. In the case where the image data that is read by the scanner 222 is transmitted by fax from the MFP 101 via the PSTN 110, it is possible to eliminate effort and time spent specifying the address by referring to the address book data as shown in FIG. 17. It may also be possible to resister the address of an electronic mail, the address of file transmission (FTP, SMB, WebDAV), etc., besides the address of fax transmission.

Figure 18:
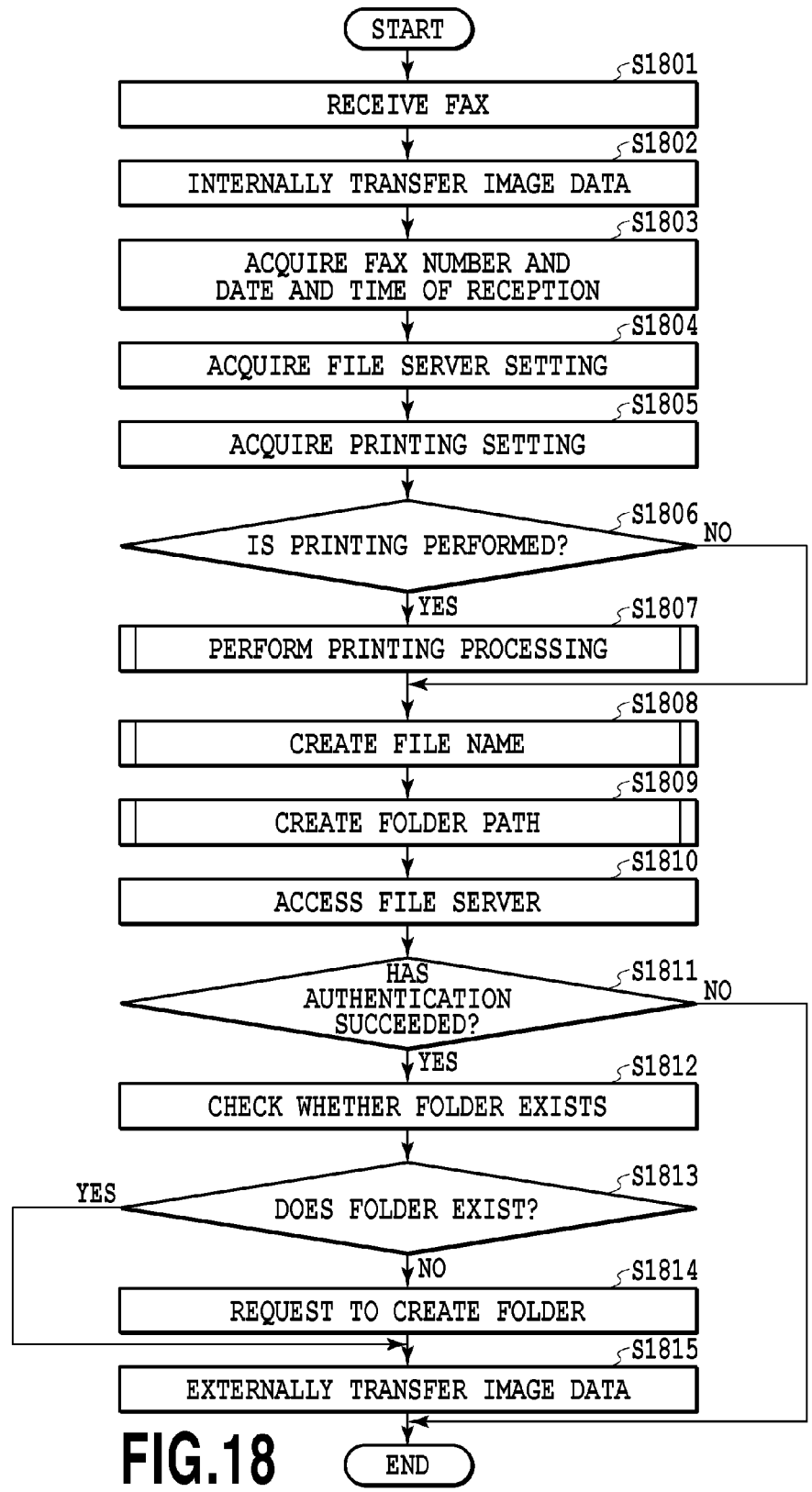
FIG. 18 is a flowchart showing a flow of processing until received fax data is transferred to a file server.

Subsequently, a flow of processing until the MFP 101 transfers received fax data to the file server 102 is explained in detail. FIG. 18 is a flowchart showing a flow of processing until the MFP 101 transfers received fax data to the file server 102. The series of processing is implemented by the CPU 211 executing the control program stored in the HDD 214 of the MFP 101 after developing the program onto the RAM 213.

At step 1801, image data is received by fax by the fax reception unit 411. The image data (fax data) received by fax is sent to the first transfer unit 412.

At step 1802, the received fax data is internally transferred by FTP to the second reception unit 422 of the fax transfer function unit 420 by the first transfer unit 412. The internally transferred fax data is further delivered to the second transfer unit 421.

At step 1803, in the second transfer unit 421 of the fax transfer function unit 420, the fax number of the source of transmission and the date and time of reception are acquired from the control file that is transferred along with the fax data.

At step 1804, in the second transfer unit 421, the contents of the file server setting included in the above-described "transfer/printing setting" are acquired.

At step 1805, in the printing unit 413, the contents of the paper output setting included in the "transfer/printing setting" are acquired.

At step 1806, whether the contents of the paper output setting acquired at step 1805 are ON or OFF is determined. In the case where the setting is OFF, the processing proceeds to step 1808. In the case where the setting is ON, the processing proceeds to step 1807.

Figure 19:
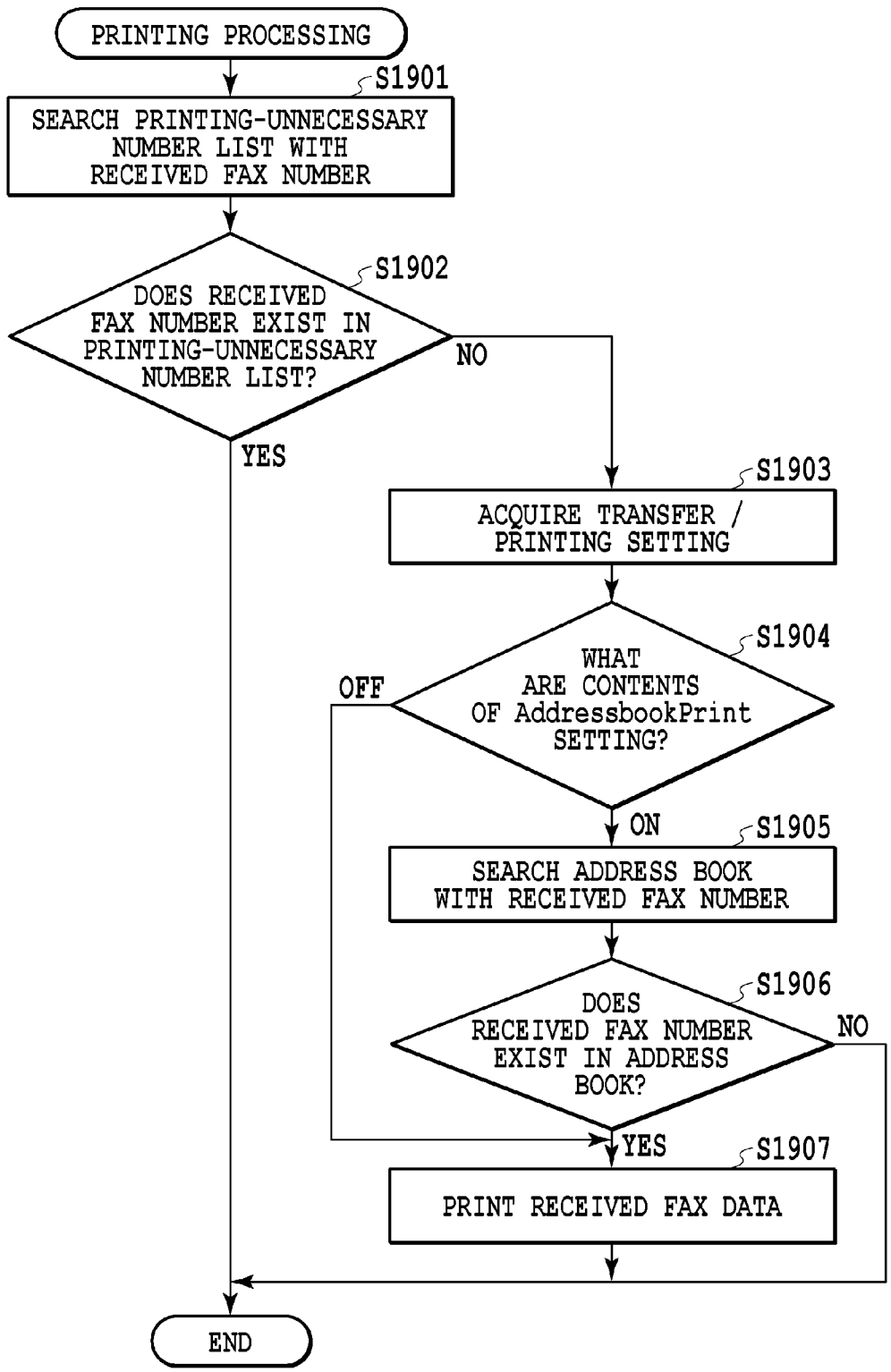
FIG. 19 is a flowchart showing details of printing control processing in a second transfer unit.

At step 1807, printing processing is performed under the control of the second transfer unit 421. FIG. 19 is a flowchart showing details of the printing processing (S1807) in the second transfer unit 421.

At step 1901, the search in the above-described printing-unnecessary number list is performed with the fax number of the received fax data.

At step 1902, whether or not the fax number of the received fax data exists in the printing-unnecessary number list as the results of the above-described search is determined. In the case where the fax number exists, the present processing is terminated without performing printing for the fax data (the processing proceeds to step 1808). In the case where the fax number does not exist, the processing proceeds to step 1903.

At step 1903, information on the "transfer/printing setting" is acquired. As described above, the "transfer/printing setting" includes the "AddressbookPrint setting" and information about whether or not outputting on paper of the received fax from the fax number not registered in the address book is necessary is included (ON: printing is not performed, OFF: printing is performed).

At step 1904, whether the contents of the Addressbook-Print setting in the acquired "transfer/printing setting" are ON or OFF (whether the setting is that the printout of the received fax from the fax number not registered in the address book is not produced) is determined. In the case where the AddressbookPrint setting is ON (the checkbox 1301 on the Junk fax setting screen 1300 is checked), the processing proceeds to step 1905. In the case where the AddressbookPrint setting is OFF (the checkbox 1301 on the Junk fax setting screen 1300 is not checked), the processing proceeds to step 1907.

At step 1905, an inquiry is made to the address book storage unit 414 about whether or not the fax number of the received fax data is registered in the address book data. Upon receipt of the inquiry, the address book storage unit 414 searches the address book data to check whether the fax number of the received fax data is registered, and then, returns the search results to the second transfer unit 421.

At step 1906, upon receipt of the response from the address book storage unit 414, whether the fax number of the received fax data is registered in the address book is determined. In the case where the fax number of the received fax data is not registered in the address book, the present processing is terminated without performing printing for the fax data. In the case where the fax number of the received fax data is registered in the address book, the processing proceeds to step 1907.

At step 1907, the printing unit 413 is given instructions to print the received fax data. Upon receipt of the instructions, the printing unit 413 performs printing of the received fax data. The above is the contents of the printing control processing by the second transfer unit 421. Explanation is returned to the flow in FIG. 18.

Figure 20:
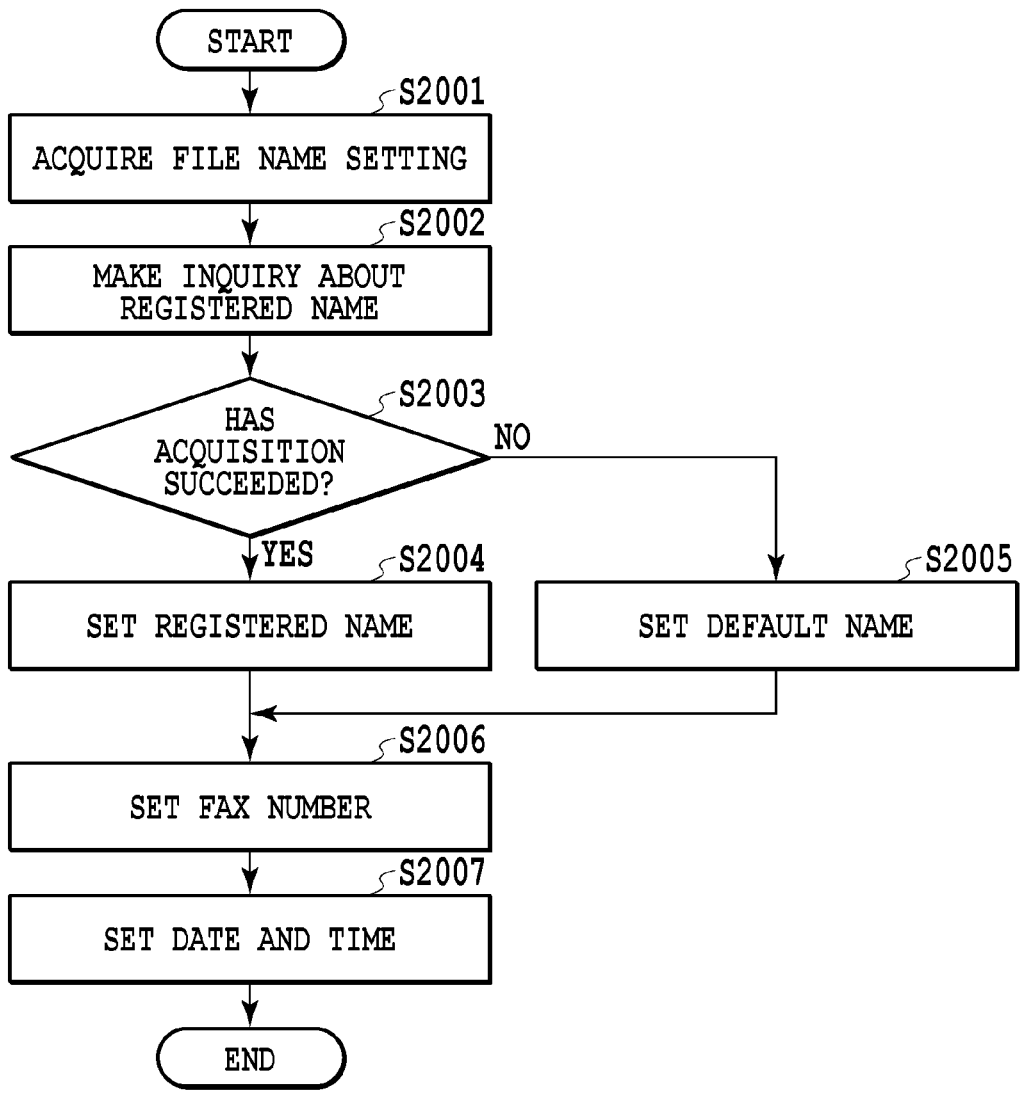
FIG. 20 is a flowchart showing details of file name creation processing in the second transfer unit.

At step 1808, in the second transfer unit 421, a file name that is set for the received fax data is created. FIG. 20 is a flowchart showing details of file name creation processing (S1808) in the second transfer unit 421.

At step 2001, the file name setting included in the above-described "transfer/printing setting" is acquired.

At step 2002, an inquiry is made to the address book storage unit 414 about the name that is registered in association with the fax number of the source of transmission.

At step 2003, whether or not the acquisition of the registered name from the address book storage unit 414 has succeeded is determined, and in the case where the acquisition of the registered name has succeeded, the processing proceeds to step 2004, and in the case where the acquisition of the registered name has failed (e.g., in the case where the fax number of the source of transmission is not registered in the address book), the processing proceeds to step 2005.

At step 2004, the acquired registered name is set as part of the file name.

At step 2005, a default name is set as part of the filename. The default name is, for example, a character string of "no name".

At step 2006, the fax number acquired at step 1803 is set as part of the file name.

At step 2007, the date and time of reception acquired at step 1803 is set as part of the file name. The above is the contents of the file name creation processing. Each setting at steps 2004 to 2007 is performed in accordance with the contents of the file name setting acquired at step 2001. Explanation is returned to the flow in FIG. 18.

Figure 21:
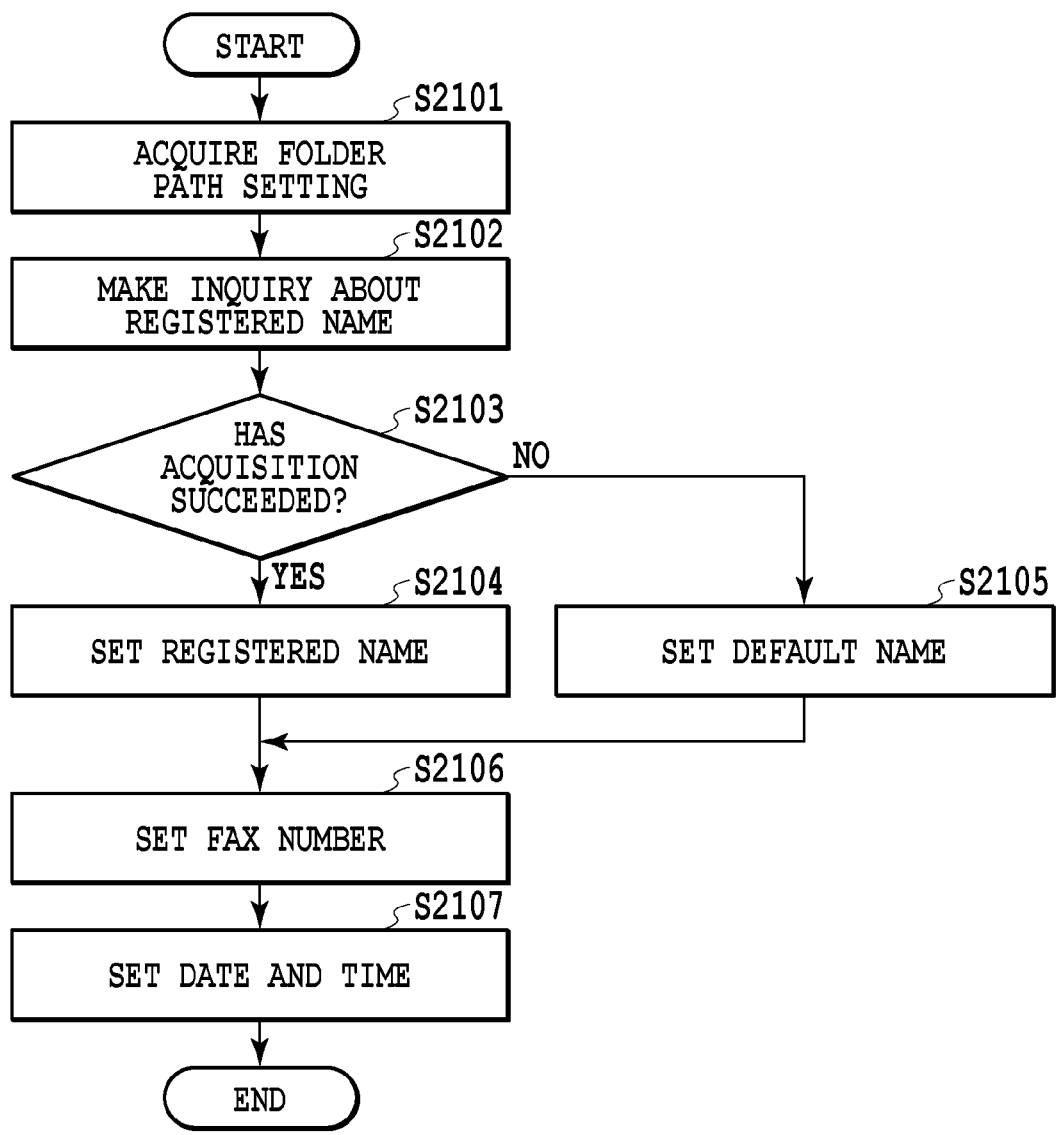
FIG. 21 is a flowchart showing details of folder path creation processing in the second transfer unit.

At step 1809, in the second transfer unit 421, a folder path for specifying the storage destination of the received fax data is created. FIG. 21 is a flowchart showing details of folder path creation processing (S1809) in the second transfer unit 421.

At step 2101, the folder path setting included in the above-described "transfer/printing setting" is acquired.

At step 2102, an inquiry is made to the address book storage unit 414 about the name that is registered in association with the fax number of the source of transmission. In the case where the registered name has already been acquired at step 2002 in the flow in FIG. 20 described previously, this step may be omitted.

At step 2103, whether or not the acquisition of the registered name from the address book storage unit 414 has succeeded is determined and in the case where the acquisition of the registered name has succeeded, the processing proceeds to step 2104, and in the case where the acquisition of the registered name has failed (e.g., in the case where the fax number of the source of transmission is not registered in the address book), the processing proceeds to step 2105.

At step 2104, the acquired registered name is set as part of the folder path.

At step 2105, a default name is set as part of the folder path. The default name is, for example, a character string of "no name".

At step 2106, the fax number acquired at step 1803 is set as part of the folder path.

At step 2107, the date and time of reception acquired at step 1803 is set as part of the folder path. The above is the contents of the folder path creation processing. Each setting at steps 2104 to 2107 is performed in accordance with the contents of the folder path setting acquired at step 2101. Explanation is returned to the flow in FIG. 18.

At step 1801, the second transfer unit 421 accesses the file server 102. Then, the second transfer unit 421 transmits the user name and the password included in the file server setting acquired at step 1804 to the file server 102 and receives the results of authentication by the file server 102.

At step 1811, in the second transfer unit 421, whether or not the received authentication results indicate that the authentication has succeeded (the login to the file server 102 has succeeded) is determined. In the case where the authentication has succeeded, the processing proceeds to step 1812, and in the case where the authentication has failed, the present processing is terminated.

At step 1812, the second transfer unit 421 makes an inquiry to the file server 102 about whether or not the folder indicated by the folder path created at step 1809 exists.

At step 1813, the processing is classified in accordance with the results of the inquiry. In the case where the folder that is identified by the above-described folder path does not exist, the processing proceeds to step 1814 and in the case where the folder exists, the processing proceeds to step 1815.

At step 1814, the second transfer unit 421 requests the file server 102 to create the folder indicated by the folder path created at step 1806.

At step 1815, the second transfer unit 421 externally transfers the fax data to the file server 102. Then, in the file server 102, the fax data is stored in the folder indicated by the folder path created at step 1809.

The above is the contents of the processing until the MFP 101 transfers the received fax data to the file server 102.

As explained above, in the present embodiment, it is possible to collectively perform a setting easily so that printing of the received fax from the fax number not registered in the address book data is not performed. Further, by individually registering fax numbers of received faxes for which printing is not necessary in the printing-unnecessary number list, it is possible to perform control so that the received fax data the source of transmission of which is a specific fax number is not printed. Then, by providing a user interface (see FIG. 13) that enables a user to perform the above-described two kinds of setting of printing control on the same operation screen, the convenience of the user is further improved. For example, in the case where the collective setting is set to ON, even for a fax number that is registered in the address book, it is possible to prevent the received fax data from the specific fax number from being printed by registering the specific number for which printing is not necessary in the printing-unnecessary number list. Further, even in the case where a user uses the MFP with the collective setting being set to OFF, it is possible to prevent the received fax data from the specific number from being printed by registering the specific number from which a junk fax is transmitted in the printing-unnecessary number list. As described above, by providing a user interface having the above-described two kinds of setting of printing control, it is possible to perform a flexible setting in accordance with the use environment of the user.

Modification Example

Next, an aspect is explained as a modification example, in which whether printing is performed in the case where the fax number of the source of transmission is anonymous is set on the junk fax setting screen, in place of whether the received fax from the fax number not registered in the address book is printed is set.

Figure 23:
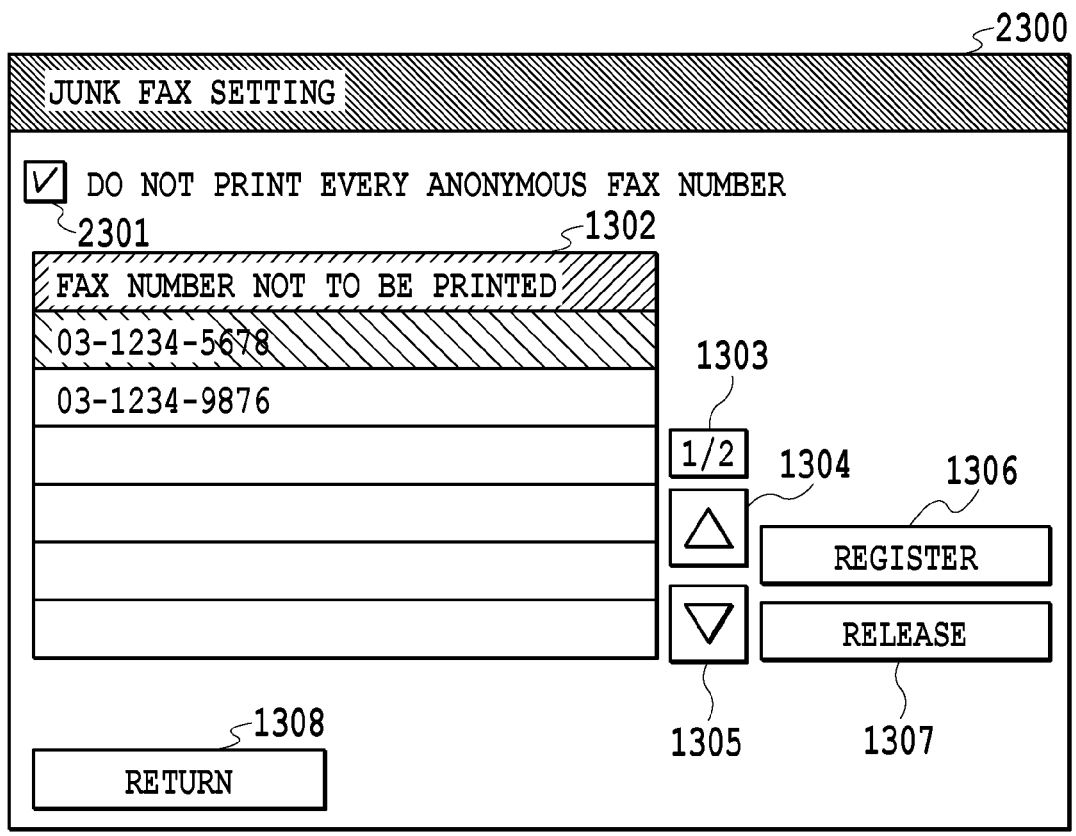
FIG. 23 is a diagram showing an example of a Junk fax setting screen according to a modification example.

FIG. 23 is a diagram showing an example of a junk fax setting screen according to the present modification example. A checkbox 2301 on a Junk fax setting screen 2300 is a checkbox for setting whether a printout of received fax data the fax number of the source of transmission of which is anonymous is produced. In the state where the checkbox 2301 is checked, the printout of the received fax data the fax number of which is anonymous is not produced. The other display boxes 1302 and 1303 and the buttons 1304 to 1308 are the same as those on the Junk fax setting screen 1300 shown in FIG. 13, and therefore, explanation thereof is omitted. In the case of the present modification example, by checking the checkbox 2301, the printout of the received fax data from an anonymous fax number is not produced, and further, the printout of the received fax data from the fax number registered in the printing-unnecessary number list is also not produced.

Subsequently, the "transfer/printing setting" according to the present modification example is explained. FIG. 24 is a diagram showing an example of the contents that are set as the "transfer/printing setting" in the present modification example. The contents on the lines 1601 to 1607 are the same as those of the "transfer/printing setting" shown in FIG. 16, and therefore, explanation thereof is omitted. On a line 2401, whether or not the checkbox 2301 on the Junk fax setting screen 2300 is checked, i.e., a setting of whether or not a printout of received fax data the fax number of the source of transmission of which is anonymous is produced is described. In the example in FIG. 24, an AnonymousnumberPrint setting is "ON", i.e., the setting is that a received fax from an anonymous fax number is not output on paper (checkbox is checked). In the case of the setting that a received fax from an anonymous fax number is output on paper, the AnonymousnumberPrint setting is "OFF".

Figure 25:
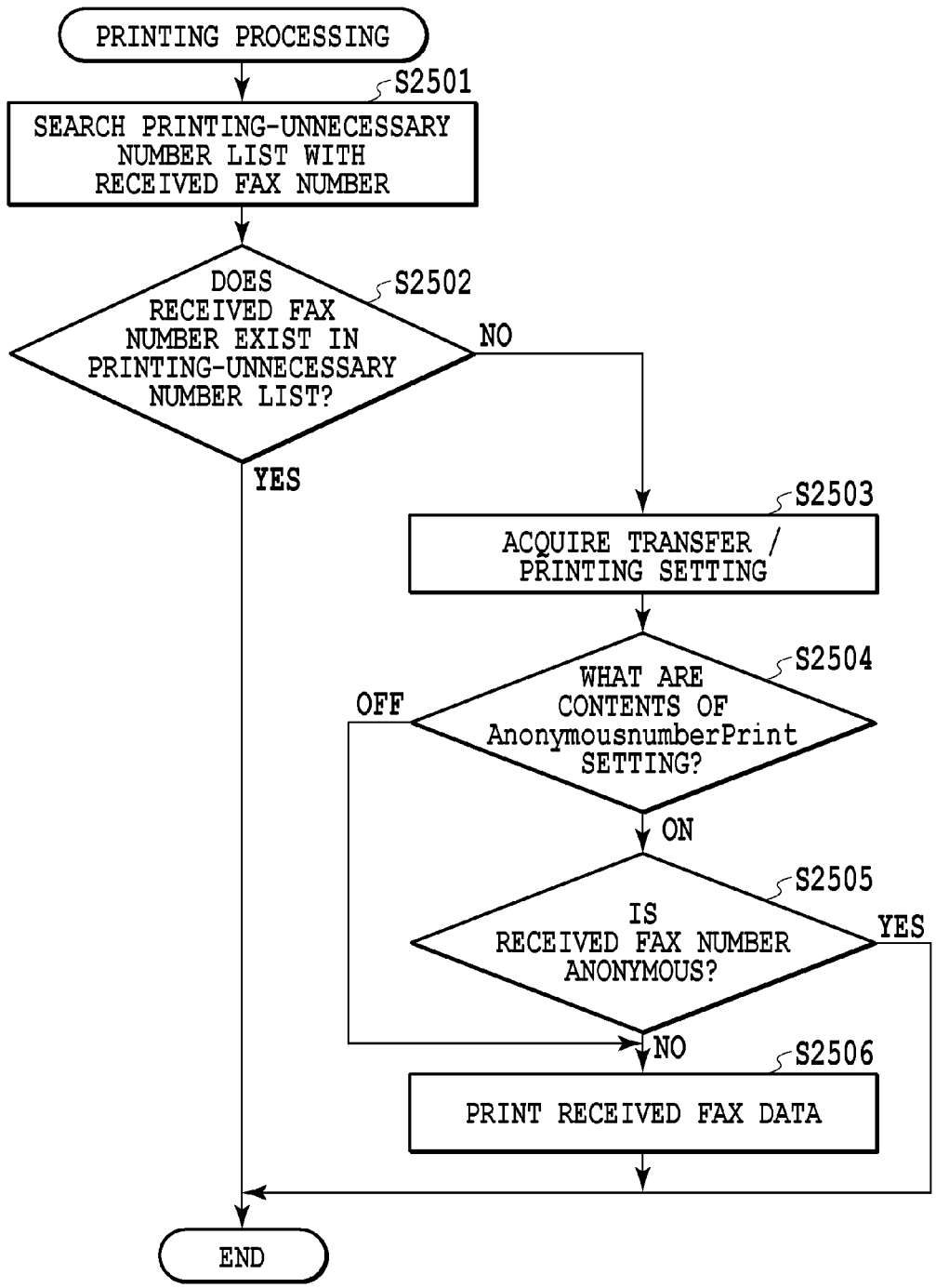
FIG. 25 is a flowchart showing details of printing control processing in a second transfer unit according to a modification example.

FIG. 25 is a flowchart showing details of printing control processing in the second transfer unit according to the present modification example.

At step 2501, the above-described printing-unnecessary number list is searched with the fax number of the received fax data.

At step 2502, based on the results of the above-described search, whether or not the fax number of the received fax data exists in the printing-unnecessary number list is determined. In the case where the fax number exists, the present processing is terminated without performing printing for the fax data (the processing proceeds to step 1808). In the case where the fax number does not exist, the processing proceeds to step 2503.

At step 2503, the information on the "transfer/printing setting" is acquired. As described above, in the "transfer/printing setting" of the present modification example, the "AnonymousnumberPrint setting" is included and the information on whether or not a received fax from an anonymous fax number needs to be output on paper (ON: printing is not performed, OFF: printing is performed) is included.

At step 2504, whether the contents of the AnonymousnumberPrint setting in the acquired "transfer/printing setting" are ON or OFF (whether the setting is that a printout of a fax from an anonymous fax number is not produced) is determined. In the case where the AnonymousnumberPrint setting is ON (the checkbox 2301 on the Junk fax setting screen 2300 is checked), the processing proceeds to step 2505. In the case where the AnonymousnumberPrint setting is OFF (the checkbox 2301 on the Junk fax setting screen 2300 is not checked), the processing proceeds to step 2506.

At step 2505, whether the fax number of the received fax data is anonymous is determined. In the case where the fax number of the received fax data is anonymous, the present processing is terminated without performing printing for the fax data. In the case where the fax number of the received fax data is known, the processing proceeds to step 2506.

At step 2506, the printing unit 413 is given instructions to print the received fax data. Upon receipt of the instructions, the printing unit 413 performs printing of the received fax data. The above is the contents of the printing control processing by the second transfer unit 421 according to the present modification example.

As explained above, according to the present modification example, it is possible to collectively perform the setting so that printing is not performed for a received fax from an anonymous fax number. Further, by individually registering the fax number of the received fax for which printing is not necessary in the printing-unnecessary number list, it is possible to perform control so that received fax data the source of transmission of which is a specific fax number is not printed. It may also be possible to combine the contents of the present modification example with the checkbox for collectively performing the setting so that a received fax from a fax number not registered in the above-described address book data is not printed.

Further, in the present embodiment, explanation is given on the assumption that various setting operations are performed in the operation unit 220 on the MFP 101, but a configuration may be accepted in which the various setting operations are performed in an application that runs on a PC, not shown.

As explained above, according to the present embodiment, it is possible to easily perform the setting of printing control based on the fax number of the source of transmission for the receive fax for which the printout is not necessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to easily perform the setting of printing control based on the fax number of the source of transmission for the receive fax for which the printout is not necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-87610, filed Apr. 22, 2015 which is hereby incorporated by reference wherein in its entirety.

What is claimed is:

1. An apparatus equipped with a fax function, the apparatus comprising:
a user interface that performs first and second settings, wherein the first setting sets one or more specific fax numbers so that a printout of received fax data relating to the set one or more specific fax numbers is not produced, and
wherein the second setting is a setting for a printout of received fax data, that relate to a fax number that does not exist in an address book, not to be produced; and
at least one processor that controls production of a printout of received fax data in accordance with the first and second settings, wherein
the at least one processor:
performs control so that, in a case where the second setting is set, a printout of the received fax data is not produced on a condition that the fax number of the source of transmission of the received fax data corresponds to at least one of a fax number that does not exist in the address book and the one or more specific fax numbers that are set by the first setting; and
performs control so that, in a case where the second setting is set, a printout of the received fax data is produced on a condition that the fax number of the source of transmission of the received fax data corresponds to neither the fax number that does not exist in the address book nor the one or more specific fax numbers that are set by the first setting; and
performs control so that, in a case where the second setting is not set, a printout of the received fax data is not produced on a condition that the fax number of the source of transmission of the received fax data corresponds to the one or more specific fax numbers that are set by the first setting; and
performs control so that, in a case where the second setting is not set, a printout of the received fax data is produced on a condition that the fax number of the source of transmission of the received fax data does not correspond to the one or more specific fax numbers that is set by the first setting.

2. The apparatus according to claim 1, wherein
the user interface is a user interface with which it is possible to perform the first setting and the second setting on a same operation screen.

3. An apparatus equipped with a fax function, the apparatus comprising:
a user interface that performs first and second settings, wherein the first setting sets one or more specific fax numbers so that a printout of received fax data relating to the set one or more specific fax numbers is not produced, and wherein the second setting is a setting for a printout of received fax data, that relate to a fax number of a source of transmission of which cannot be acquired, not to be produced; and
at least one processor that controls production of a printout of received fax data in accordance with the first and second settings, wherein
the at least one processor:
performs control so that, in a case where the second setting is set, a printout of the received fax data is not produced on a condition that at least one of two facts is true that the fax number of the source of transmission of the received fax data cannot be acquired and that the fax number of the source of transmission of the received fax data corresponds to the one or more specific fax numbers that are set by the first setting; and
performs control so that, in a case where the second setting is set, a printout of the received fax data is produced on a condition that neither of the two facts is true; and
performs control so that, in a case where the second setting is not set, a printout of the received fax data is not produced on a condition that the fax number of the source of transmission of the received fax data corresponds to the one or more specific fax numbers that are set by the first setting; and
performs control so that, in a case where the second setting is not set, a printout of the received fax data is produced on a condition that the fax number of the source of transmission of the received fax data does not correspond to the one or more specific fax numbers that are set by the first setting.

4. The apparatus according to claim 3, wherein
the user interface is a user interface with which it is possible to perform the first setting and the second setting on a same operation screen.

5. A control method performed by an apparatus equipped with a fax function, the control method comprising steps of:
performing first and second settings on a user interface, wherein the first setting sets one or more specific fax numbers so that a printout of received fax data relating to the set one or more specific fax numbers is not produced, and wherein the second setting is a setting for a printout of received fax data, that relate to a fax number that does not exist in an address book, not to be is not produced;
performing control so that, in a case where the second setting is set, a printout of the received fax data is not produced on a condition that the fax number of the source of transmission of the received fax data corresponds to at least one of a fax number that does not exist in the address book and the one or more specific fax numbers that are set by the first setting;
performing control so that, in a case where the second setting is set, a printout of the received fax data is produced on a condition that the fax number of the source of transmission of the received fax data corresponds neither the fax number that does not exist in the address book nor the one or more specific fax numbers that are set by the first setting;
performing control so that, in a case where the second setting is not set, a printout of the received fax data is not produced on a condition that the fax number of the source of transmission of the received fax data corresponds to the one or more specific fax numbers that are set by the first setting; and
performing control so that, in a case where the second setting is not set, a printout of the received fax data is produced on a condition that the fax number of the source of transmission of the received fax data does not correspond to the one or more specific fax numbers that is set by the first setting.

6. A control method performed by an apparatus equipped with a fax function, the control method comprising steps of:
performing first and second settings on a user interface wherein the first setting sets one or more specific fax numbers so that a printout of received fax data relating to the set one or more specific fax numbers is not produced, and wherein the second setting is a setting for a printout of received fax data, that relate to a fax number of a source of transmission of which cannot be acquired, not to be produced;
performing control so that, in a case where the second setting is set, a printout of the received fax data is not produced on a condition that at least one of two facts is true that the fax number of the source of transmission of the received fax data cannot be acquired and that the fax number of the source of transmission of the received fax data corresponds to the one or more specific fax numbers that are set by the first setting;
performing control so that, in a case where the second setting is set, a printout of the received fax data is produced on a condition that neither of the two facts is true;
performing control so that, in a case where the second setting is not set, a printout of the received fax data is not produced on a condition that the fax number of the source of transmission of the received fax data corresponds to the one or more specific fax numbers that are set by the first setting; and
performing control so that, in a case where the second setting is not set, a printout of the received fax data is produced on a condition that the fax number of the source of transmission of the received fax data does not correspond to the one or more specific fax numbers that are set by the first setting.

7. A non-transitory computer readable storage medium storing a program for causing a computer to perform a control method, the control method comprising steps of:
performing first and second settings on a user interface, wherein the first setting sets one or more specific fax numbers so that a printout of received fax data relating to the set one or more specific fax numbers is not produced, and wherein the second setting is a setting for a printout of received fax data, that relate to a fax number that does not exist in an address book, not to be produced;
performing control so that, in a case where the second setting is set, a printout of the received fax data is not produced on a condition that the fax number of the source of transmission of the received fax data corresponds to at least one of a fax number that does not exist in the address book and the one or more specific fax numbers that are set by the first setting;
performing control so that, in a case where the second setting is set, a printout of the received fax data is produced on a condition that the fax number of the source of transmission of the received fax data corresponds neither the fax number that does not exist in the address book nor the one or more specific fax numbers that are set by the first setting;
performing control so that, in a case where the second setting is not set, a printout of the received fax data is not produced on a condition that the fax number of the source of transmission of the received fax data corresponds to the one or more specific fax numbers that are set by the first setting; and
performing control so that, in a case where the second setting is not set, a printout of the received fax data is produced on a condition that the fax number of the source of transmission of the received fax data does not correspond to the one or more specific fax numbers that is set by the first setting.

8. A non-transitory computer readable storage medium storing a program for causing a computer to perform a control method, the control method comprising steps of:
performing first and second settings on a user interface, wherein the first setting sets one or more specific fax numbers so that a printout of received fax data relating to the set one or more specific fax numbers is not produced, and wherein the second setting is a setting for a printout of received fax data, that relate to a fax number of a source of transmission of which cannot be acquired, not to be produced;
performing control so that, in a case where the second setting is set, a printout of the received fax data is not produced on a condition that at least one of two facts is true that the fax number of the source of transmission of the received fax data cannot be acquired and that the fax number of the source of transmission of the received fax data corresponds to the one or more specific fax numbers that are set by the first setting;
performing control so that, in a case where the second setting is set, a printout of the received fax data is produced on a condition that neither of the two facts is true;
performing control so that, in a case where the second setting is not set, a printout of the received fax data is not produced on a condition that the fax number of the source of transmission of the received fax data corresponds to the one or more specific fax numbers that are set by the first setting; and performing control so that, in a case where the second setting is not set, a printout of the received fax data is produced on a condition that the fax number of the source of transmission of the received fax data does not correspond to the one or more specific fax numbers that are set by the first setting.

\* \* \* \* \*